United States Patent
Salam et al.

(10) Patent No.: US 11,894,756 B2
(45) Date of Patent: Feb. 6, 2024

(54) SYSTEMS AND METHODS FOR ELECTRIC PROPULSION SYSTEMS FOR ELECTRIC ENGINES

(71) Applicant: Honeywell International Inc., Charlotte, NC (US)

(72) Inventors: Mohamed A. Salam, Rancho Palos Verdes, CA (US); Robert A. Dietrich, Montebello, CA (US); Evgeni Ganev, Torrance, CA (US); Stephen L. White, Whittier, CA (US)

(73) Assignee: Honeywell International Inc., Charlotte, NC (US)

( * ) Notice: Subject to any disclaimer, the term of this patent is extended or adjusted under 35 U.S.C. 154(b) by 299 days.

(21) Appl. No.: 17/340,982

(22) Filed: Jun. 7, 2021

(65) Prior Publication Data
US 2022/0239199 A1 Jul. 28, 2022

Related U.S. Application Data

(60) Provisional application No. 63/141,078, filed on Jan. 25, 2021.

(51) Int. Cl.
*H02K 9/16* (2006.01)
*H02K 9/22* (2006.01)
(Continued)

(52) U.S. Cl.
CPC .............. *H02K 9/16* (2013.01); *H02K 5/207* (2021.01); *H02K 9/227* (2021.01); *H02K 11/33* (2016.01);
(Continued)

(58) Field of Classification Search
CPC .......... H02K 9/00; H02K 1/278; H02K 1/276; H02K 1/27; H02K 11/33; H02K 9/223;
(Continued)

(56) References Cited

U.S. PATENT DOCUMENTS 5,585,681 A * 12/1996 Bitsche ................. B60K 11/02
310/68 R
5,939,806 A     8/1999 Kim et al.
(Continued)

FOREIGN PATENT DOCUMENTS

CN       207664816 U    7/2018
DE    102019212129 A1   2/2021
(Continued)

OTHER PUBLICATIONS

Saber et al, Polyphased Electrical Machine with Integrated Power Electronics and an Integrated Coolant Circuit, Feb. 6, 2020, WO 2020025884 (English Machine Translation) (Year: 2020).*
(Continued)

*Primary Examiner* — Alexander A Singh
(74) *Attorney, Agent, or Firm* — Fogg & Powers LLC

(57) ABSTRACT

In one embodiment, an advanced electric propulsion system comprises: a housing; an electric motor within the housing; a motor drive coupled to the motor; a thermal management system comprising: a manifold-mini-channel heat sink integrated into the housing, the manifold-mini-channel heat sink comprises: an inlet manifold having air inlets formed in front of the housing; a set of plurality of circumferentially grooved micro-channels formed in the housing and coupled to the air inlets and conductively thermally coupled to stator windings of the electric motor; an outlet manifold having an air outlets formed at a back of the housing and coupled to the set of plurality of circumferentially grooved micro-channels; wherein the electric motor comprises PEW stator windings that provide a low thermal resistance path from the stator of the electric motor to the housing; wherein the PEW stator windings comprise a high temperature tolerant thermally conductive electrical insulator.

19 Claims, 17 Drawing Sheets

(51) Int. Cl.
   *H02K 5/20*      (2006.01)
   *H02K 21/14*     (2006.01)
   *H02K 11/33*     (2016.01)
   *B64D 35/02*     (2006.01)
   *B64D 27/24*     (2006.01)

(52) U.S. Cl.
   CPC ............ *H02K 21/14* (2013.01); *B64D 27/24* (2013.01); *B64D 35/02* (2013.01)

(58) Field of Classification Search
   CPC ...... H02K 9/227; H02K 21/14; H02K 5/0207; H02K 9/16; H02K 9/025; H02K 9/02; H02K 9/04; H02K 9/06; H02K 9/08; H02K 5/02; B64D 35/02; B64D 27/24; B64D 33/08
   USPC ............ 310/52, 58, 59, 60 R, 61, 62, 63, 64
   See application file for complete search history.

(56) References Cited

U.S. PATENT DOCUMENTS

| | | | |
|---|---|---|---|
| 6,198,183 | B1 | 3/2001 | Baeumel et al. |
| 6,616,059 | B2 | 9/2003 | Sabhapathy et al. |
| 6,700,236 | B2* | 3/2004 | Umeda ................ H02K 7/1815 310/201 |
| 7,030,520 | B2 | 4/2006 | Takenaka et al. |
| 7,295,440 | B2 | 11/2007 | Ganev et al. |
| 7,315,099 | B2 | 1/2008 | Steffen et al. |
| 9,768,672 | B2 | 9/2017 | Mohr |
| 10,062,497 | B2 | 8/2018 | Chen et al. |
| 10,867,741 | B2 | 12/2020 | Chen et al. |
| 10,965,183 | B2 | 3/2021 | Ganev et al. |
| 2003/0062790 | A1* | 4/2003 | Reiter, Jr. ............... H02K 15/03 310/156.01 |
| 2013/0106232 | A1 | 5/2013 | Kobayashi et al. |
| 2014/0145448 | A1* | 5/2014 | Lewis .................... H02K 7/183 310/90 |
| 2015/0001980 | A1* | 1/2015 | Zhang ................... H02K 21/16 310/156.43 |
| 2015/0188371 | A1 | 7/2015 | Kato |
| 2018/0170187 | A1 | 6/2018 | Yang et al. |
| 2018/0175679 | A1 | 6/2018 | Seo et al. |
| 2019/0245398 | A1* | 8/2019 | Hopkins ................ H02K 9/227 |
| 2020/0007007 | A1* | 1/2020 | Haran ................... H02P 27/06 |
| 2020/0373808 | A1* | 11/2020 | St. Rock ................. H02K 9/18 |
| 2020/0395811 | A1 | 12/2020 | Ganev et al. |
| 2021/0021167 | A1* | 1/2021 | Maeda ................ H01F 27/2823 |
| 2021/0036580 | A1 | 2/2021 | Cottrell |
| 2022/0119121 | A1* | 4/2022 | Lacaux .................... B60L 50/60 |

FOREIGN PATENT DOCUMENTS

| | | | |
|---|---|---|---|
| JP | H05292703 | A | 11/1993 |
| JP | 2006114810 | A * | 4/2006 |
| JP | 2006114810 | A | 4/2006 |
| JP | 2014204512 | A | 10/2014 |
| WO | 0235898 | A1 | 5/2002 |
| WO | 2012064276 | A1 | 5/2012 |
| WO | 2020025884 | A1 | 2/2020 |
| WO | WO-2020025884 | A1 * | 2/2020 ............. H01G 2/106 |

OTHER PUBLICATIONS

Memezawa et al, Manufacturing Method of Heat Resistance Insulating Coil, Apr. 27, 2006, JP 2006114810 (English Machine Translation) (Year: 2006).*

Cetegen, "Force Fed Microchannel High Heat Flux Cooling Utilizing Microgrooved Surfaces", Dissertation submitted to the Faculty of the Graduate School of the University of Maryland, College Park, in partial fulfillment of the requirements for the degree of Doctor of Philosophy, 2010, pp. 1 through 311.

Honeywell, "Honeywell High Temperature Wire Insulator (HTI)", Dec. 5, 2019, pp. 1 through 2, Honeywell.

Laskaris et al., "Liquid cooled permanent-magnet traction motor design considering temporary overloading", ICEM 2012, Session SS8-2, paper FF-010235, pp. 1 through 6, Marseille, France.

Mandel et al., "Embedded Two-Phase Cooling of High Flux Electronics via Press-Fit and Bonded FEEDS Coolers", Journal of Electronic Packaging, Sep. 2018, pp. 031003-1 through 031003-10, vol. 140, Transactions of the ASME.

Paine et al., "Design and Comparative Analysis of a Retrofitted Liquid Cooling System for High-Power Actuators", Actuators, 4, ISSN: 2076-0825, Aug. 13, 2015, pp. 182 through 202, www.mdpi.com/journal/actuators.

Tuckerman et al., "High-performance heat sinking for VLSI", IEEE Electron Device Letters, May 1981, pp. 126 through 129, vol. EDL-2, No. 5, IEEE.

Berning et al., "High-Voltage Isolated Gate Drive Circuit for 10 kV, 100 A SiC MOSFET/JBS Power Modules", IEEE Industry Applications Society (IAS) Annual Meeting, Jun. 2, 2008, pp. 1 through 7.

DAS et ak., "10 kV, 120 A SiC Half H-Bridge Power MOSFET Modules Suitable for High Frequency, Medium Voltage Applications", 2011 IEEE Energy Conversion Congress and Exposition, Sep. 2011, pp. 2689 through 2692.

Dietrich, Robert et al., "Electric Machine Stator Winding", U.S. Appl. No. 16/997,720, filed Aug. 19, 2020, 1 through 46, Published: US.

Escher et al., "Experimental Investigation of an Ultrathin Manifold Microchannel Heat Sink for Liquid-Cooled Chips", Journal of Hear Transfer-Transactions of the Asme, 132(8), Aug. 2010, pp. 1 through 10, vol. 132, ASME.

Ganev et al., "Advanced Electric Drives for Aerospace Electric and Hybrid Propulsion", AIAA Propulsion and Energy Forum, Aug. 2019, pp. 1 through 14, IEEE Electric Aircraft Technologies Symposium (EATS).

Kim et al., "Forced Air Cooling by Using Manifold Microchannel Heat Sinks", KSME International Journal, Jul. 1998, pp. 709 through 718, vol. 12, No. 4.

Mandel et al., "A "2.5-D" modeling approach for single-phase flow and heat transfer in manifold microchannels", International Journal of Heat and Mass Transfer 126, May 26, 2018, pp. 317 through 330, Elsevier.

Mandel et al., "A Heat Spreading Model for Double-Sided, Cross Flow, Manifold-Microchannel Heat Exchangers", 17th IEEE ITHERM Conference, May 29-Jun. 1, 2018, pp. 1 through 9.

Mandel et al., "Streamline Modeling of Manifold Microchannels in Thin Film Evaporation", Proceedings of the ASME 2013 Heat Transfer Summer Conference HT2013, Jul. 2013, HT2013-17731, pp. 1 through 8, ASME.

Sabri et al., "New Generation 6.5 kV SiC Power MOSFET", 2017 IEEE 5th Workshop on Wide Bandgap Power Devices and Applications (WiPDA), Oct. 2017, pp. 246 through 250, IEEE.

Yuruker et al., "A Metamodeling Approach for Optimization of Manifold Microchannel Systems for High Heat Flux Cooling Applications", 18th IEEE ITHERM Conference, May 2019, pp. 1 through 9, IEEE.

* cited by examiner

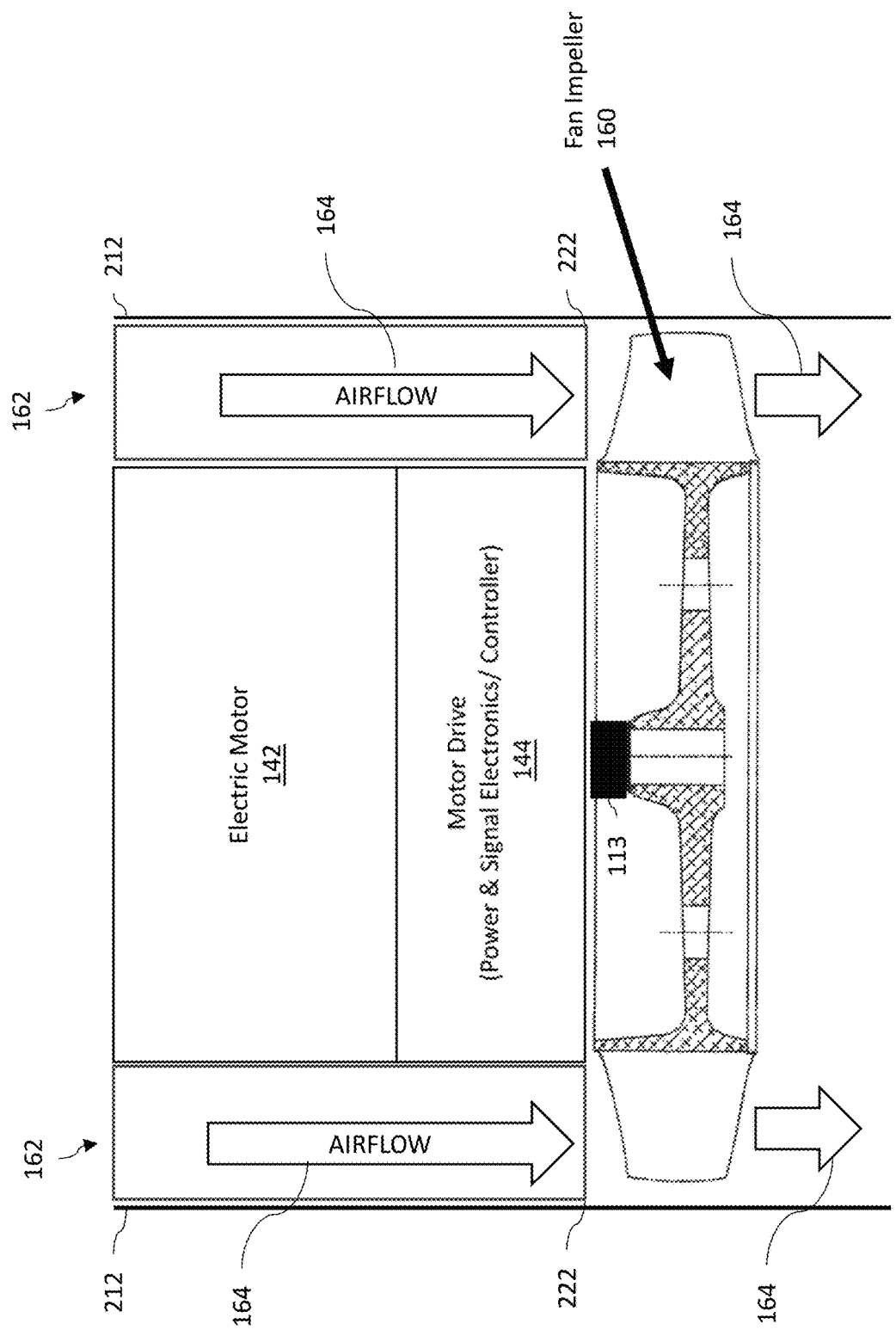

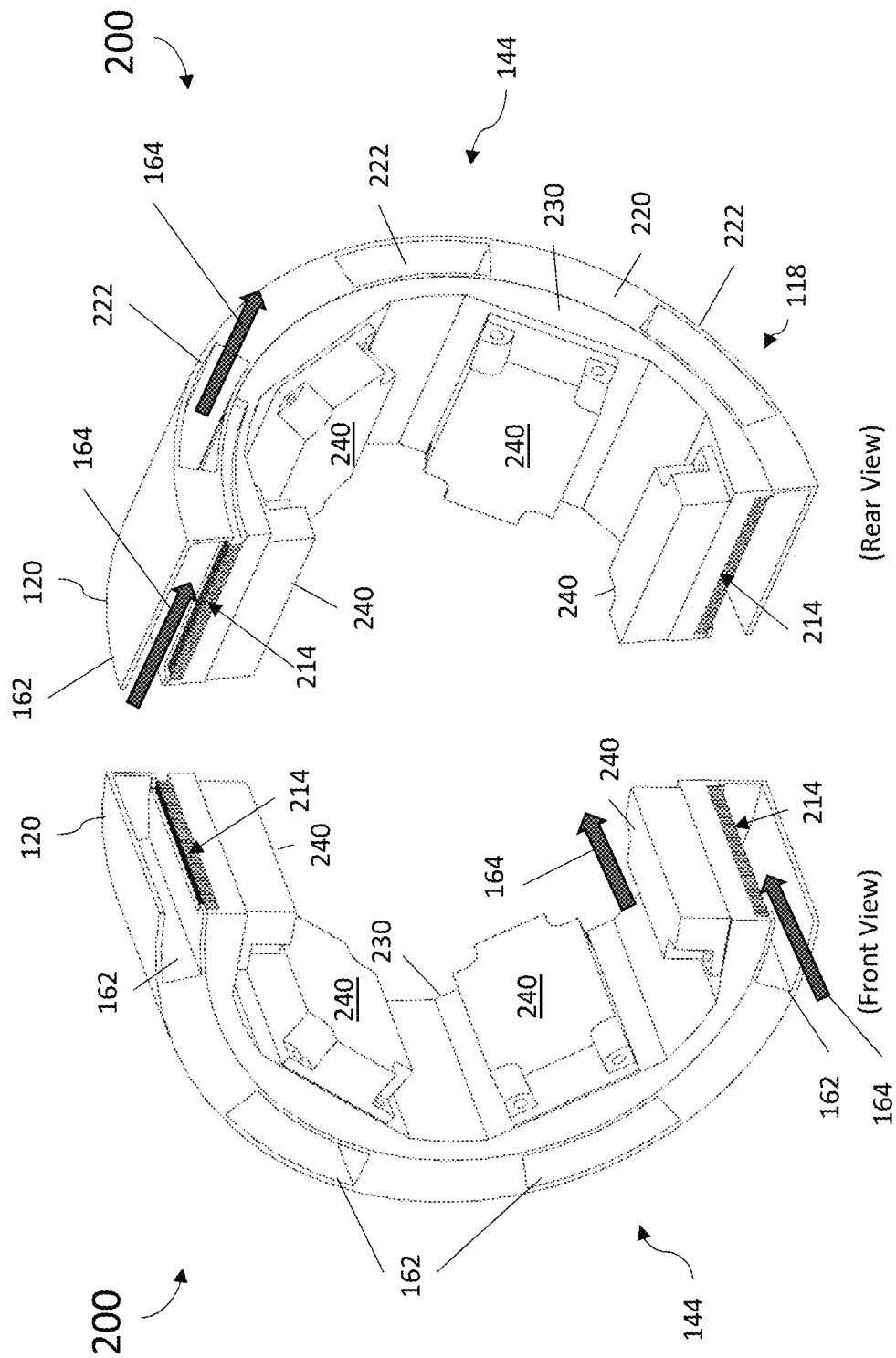

SYSTEMS AND METHODS FOR ELECTRIC PROPULSION SYSTEMS FOR ELECTRIC ENGINES

CROSS-REFERENCE TO RELATED APPLICATION

This application is a U.S. patent application claiming priority to, and the benefit of, U.S. Provisional Patent Application No. 63/141,078, titled "SYSTEMS AND METHODS FOR ELECTRIC PROPULSION SYSTEMS FOR ELECTRIC ENGINES" filed on Jan. 25, 2021, which is incorporated by reference herein in its entirety.

BACKGROUND

Electric and hybrid aircraft (EHA) are rapidly becoming a reality. At the same time, there are many problems that need to be resolved to progress successfully and affordably. The electric machines (EM), power electronics, and thermal management systems (TMS) for advanced electric propulsion systems (AEPS) play a significant role in the modern aerospace/military industry. This is particularly true in electric aircraft, including electric and hybrid propulsion. A substantial demand has arisen for improved electric drive performance including increases in high power density, improved robustness, and reduced operating costs and safety, as compared to the existing hardware. For example, one metric used to gauge an electric propulsion system is the power density. An electric propulsion system may produce a power density of 3-5 killowatts/kilogram (kW/kg). However, EHA and other electric propulsion system under development are expected to have power density specifications of 12 kW/kg or greater. Moreover, those electric propulsion systems developed so far that can achieve 12 kW/kg or greater do not adequately address thermal management sufficiently to permit prolonged operation as would be needed for real-world vehicle operations. These trends have created a significant increase in AEPS needs including increased operating voltages and reduced system losses, weight, and volume.

For the reasons stated above and for other reasons stated below which will become apparent to those skilled in the art upon reading and understanding the specification, there is a need in the art for electric propulsion systems for electric engines.

SUMMARY

The Embodiments of the present disclosure provide methods and systems for electric propulsion systems for electric engines and will be understood by reading and studying the following specification.

In one embodiment, an advanced electric propulsion system comprises: An advanced electric propulsion system, the system comprising: a housing; an electric motor within the housing; a motor drive coupled to the electric motor; a thermal management system that comprises: a manifold-mini-channel heat sink (MMHS) integrated into the housing, wherein the manifold-mini-channel heat sink comprises: an inlet manifold having a plurality of air inlets formed in a front of the housing; a set of plurality of circumferentially grooved micro-channels formed in the housing and coupled to the air inlets and conductively thermally coupled to stator windings of the electric motor; an outlet manifold having a plurality of air outlets formed at a back of the housing and coupled to the set of plurality of circumferentially grooved micro-channels; wherein the electric motor comprises Pseudo-Edge Wound (PEW) stator windings configured to provide a low thermal resistance path from the stator of the electric motor to the housing; wherein the PEW stator windings comprise a high temperature tolerant thermally conductive electrical insulator.

DRAWINGS

Embodiments of the present disclosure can be more easily understood and further advantages and uses thereof more readily apparent, when considered in view of the description of the preferred embodiments and the following figures in which:

FIG. 1D illustrates an optional fan impeller that either enhances or replaces the airflow from the propulsion system propeller.

FIGS. 2A and 2B are front-view and rear-view sectionalized diagrams of the AEPS of FIG. 1 illustrating a manifold-mini-channel heat sink integrated into the housing of the AEPS 100.

Figure 11:
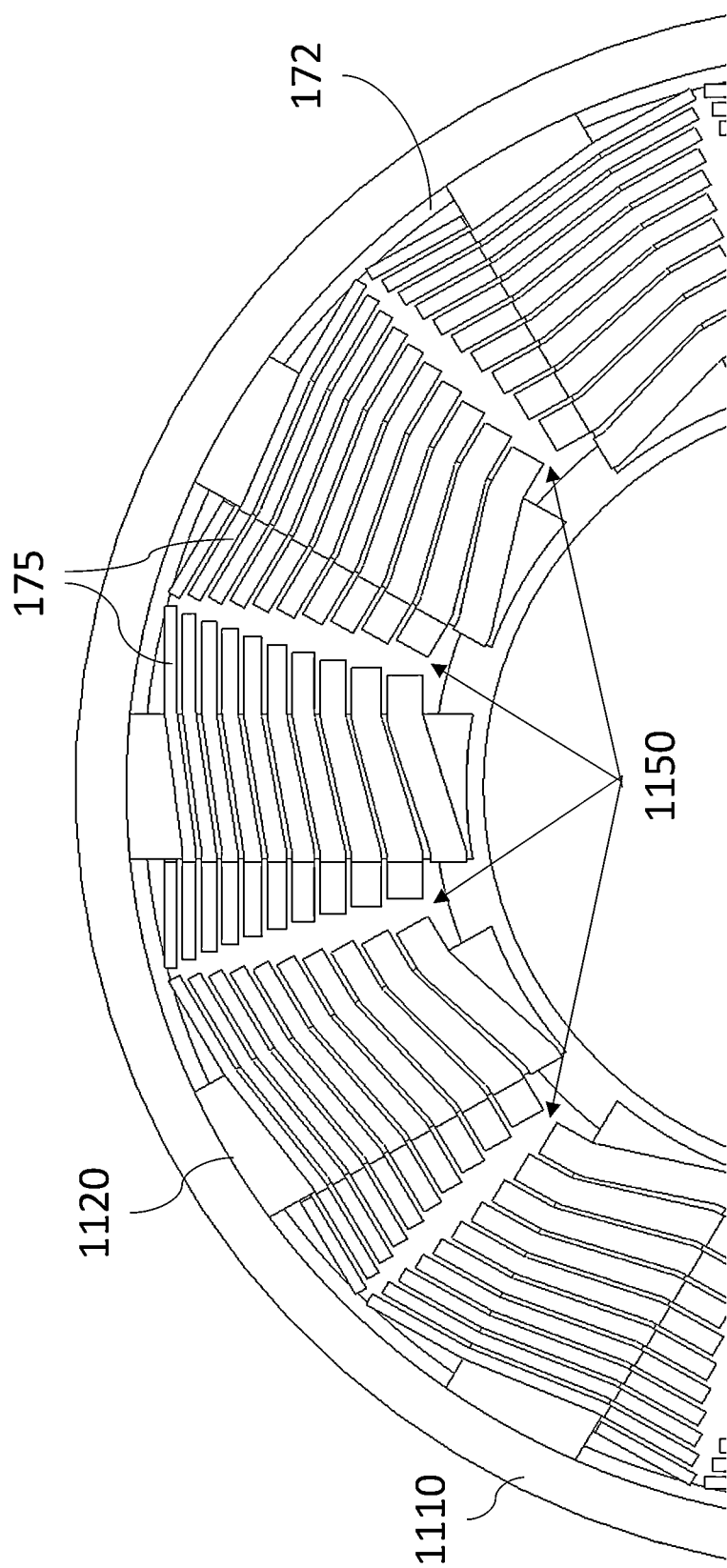

FIG. 11 an example arrangement of PEW windings.

Figure 12:
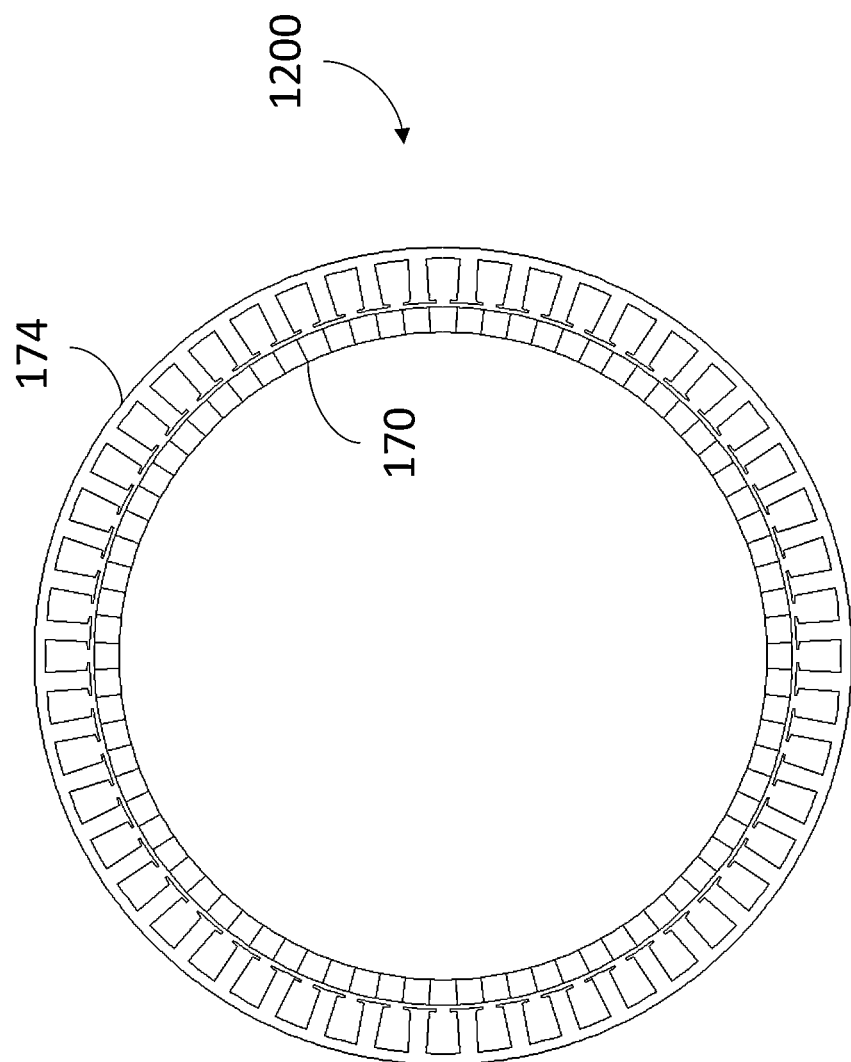

FIG. 12 shows an example embodiment of an electric motor topology.

Figure 13:
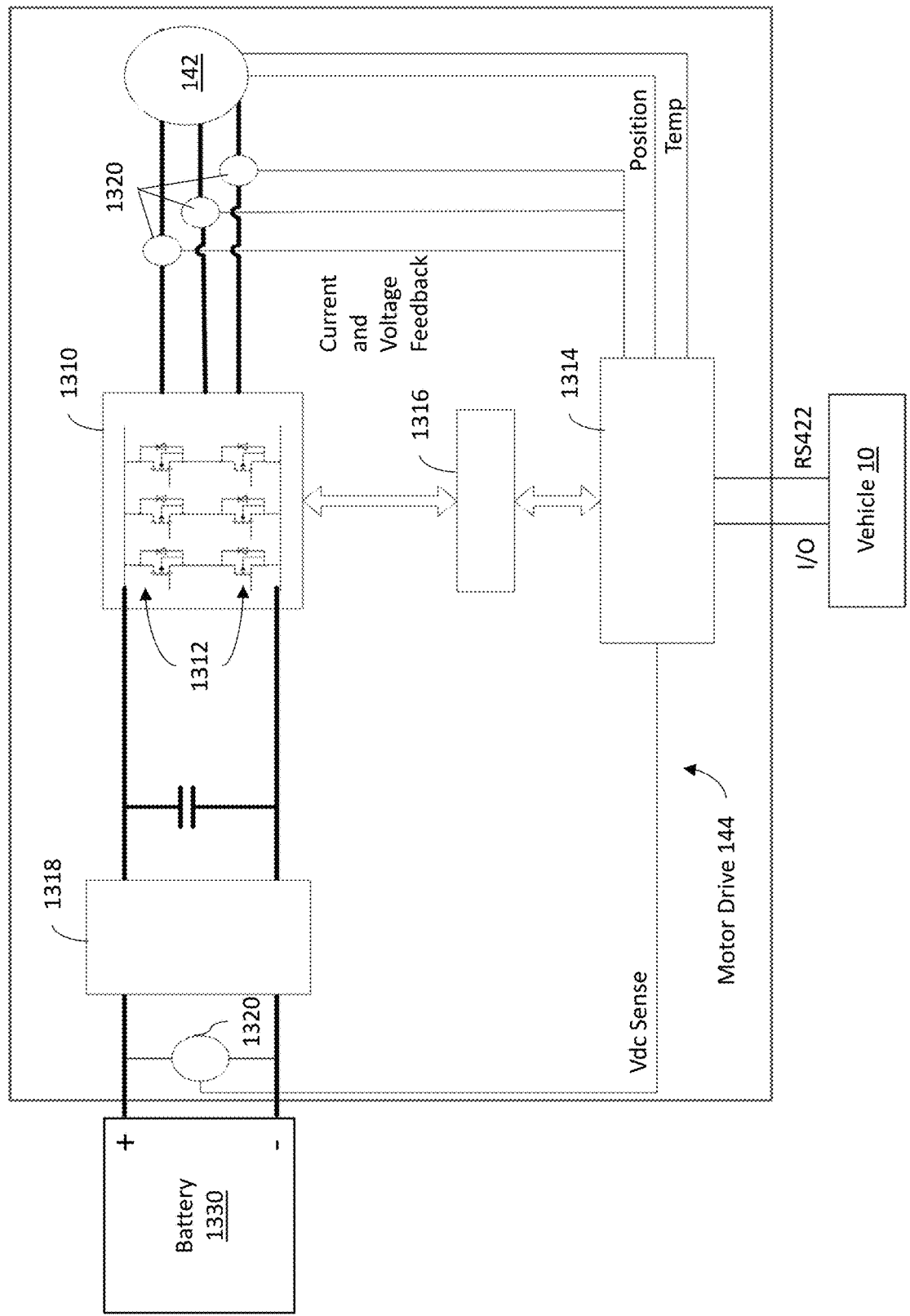

FIG. 13 is a diagram illustrating a motor drive comprising power electronics for an example Advanced Electric Propulsion System embodiment.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Embodiments of the present disclosure provide for embodiments of advanced electric propulsion systems (AEPS) that combine the features of a manifolded mini-channel heat sink (MMHS), pseudo-edge wound windings (such as pseudo-edge wound copper windings, PEWCW, for example) and a high temperature tolerant thermally conductive electrical insulator (such as High Temperature Insulation, HTI, for example). In some embodiments, this combination provides an AEPS having a direct drive to the propulsive device without using a torque amplifier for low weight, cost and volume, and high reliability. As disclosed below, the electric rotating machine (i.e., an electric motor) and the motor drive (i.e., power and control electronics) of the AEPS can be heavily integrated for better performance sharing a common chassis and cooling system. In other embodiments, however, an optional torque amplifier/gearbox may be included with the disclosed AEPS for applications where propeller speed is very low in order to facilitate utilization of the relatively high speed lightweight AEPS discussed herein.

The embodiments disclosed herein improve the power density of the electric propulsion systems (in some embodiments by about 4 times existing electric propulsion systems) facilitating new electric propulsion vehicles such as, but not limited to, narrow body electric hybrid propulsion aircraft, Urban Air Mobility (UAM) vehicles, and recreational, training, and general aviation aircraft. The embodiments described herein also disclose several innovative and transformative technologies that address the technical challenges of designing, developing and fabricating a high-power density propulsion system for electric and hybrid vehicles.

Figure 1:
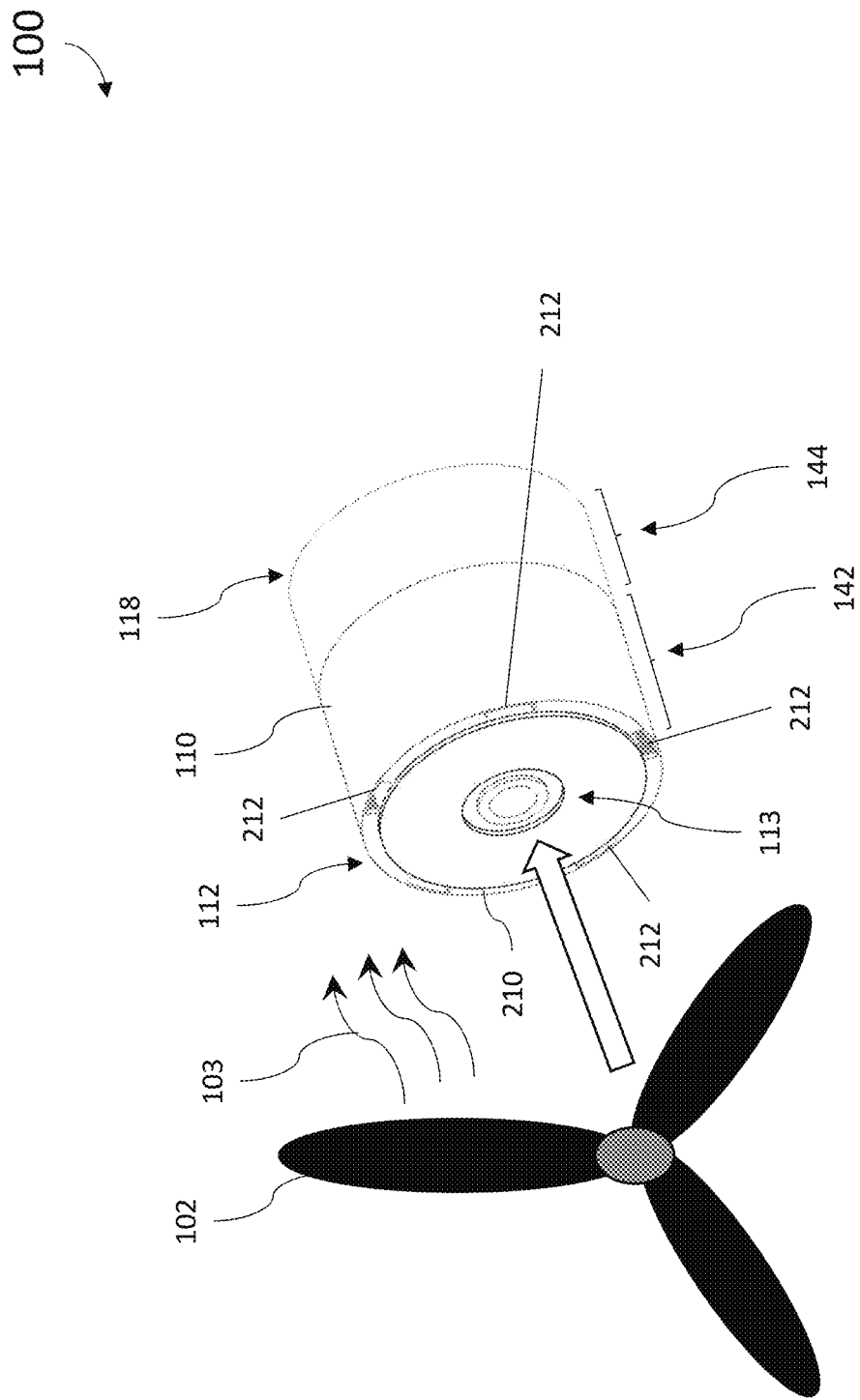
FIGS. 1, 1A, 1B and 1C illustrate an example Advanced Electric Propulsion System (AEPS) embodiment.
Figure 1A:
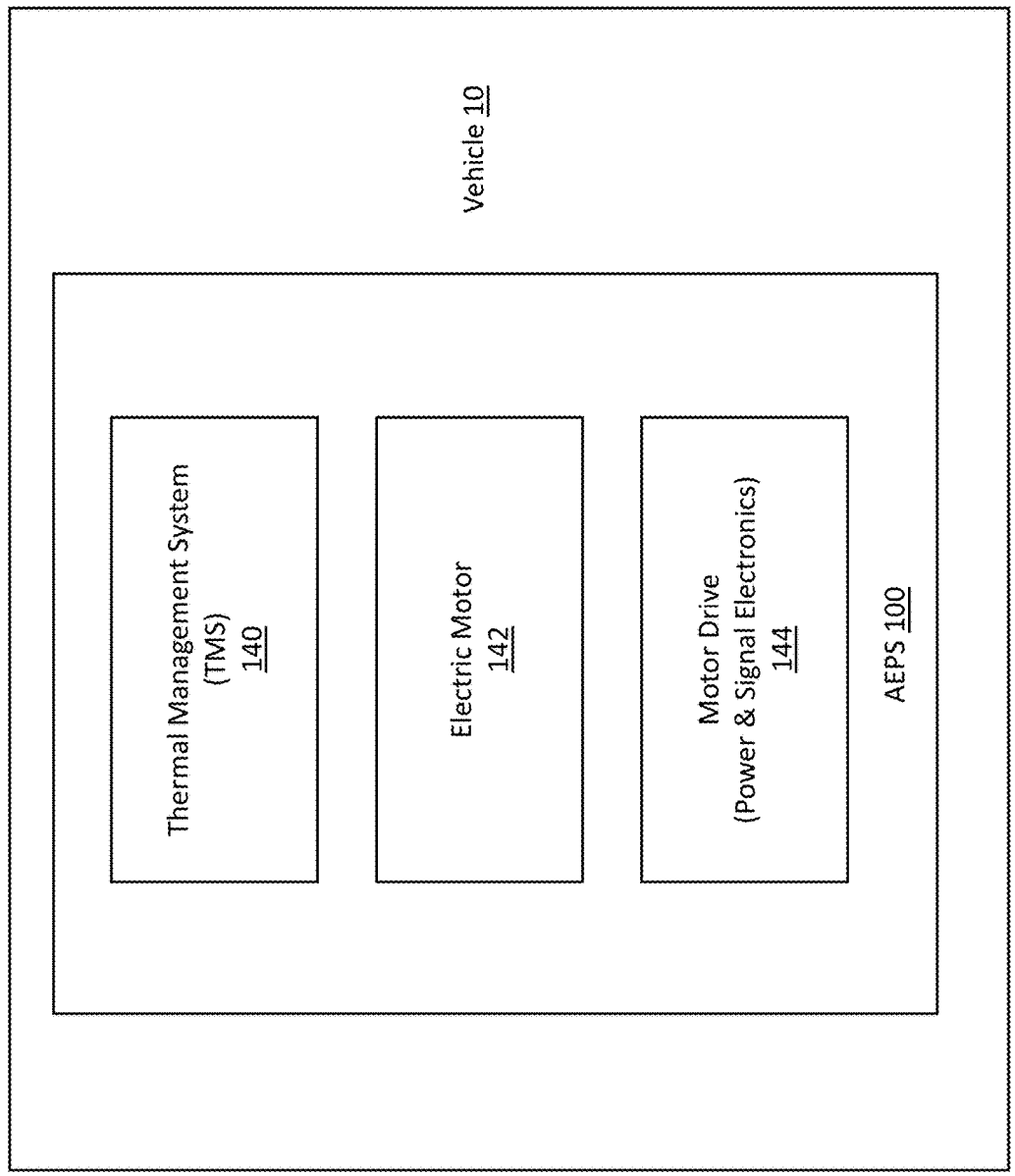

FIG. 1 is diagram illustrating a 3-Dimensional model of an example AEPS 100 embodiment for use in a vehicle. As shown in FIGS. 1 and 1A, the AEPS 100 disclosed herein includes components of a thermal management system TMS 140, an electric motor 142 and a motor drive 144, for a vehicle 10, which are described and characterized in the following sections.

Thermal Management System (TMS)

The TMS 140 of AEPS 100 utilizes a high-speed air flow 103 from the aircraft propeller/fan over the AEPS 100 exterior as a heat sink. TMS 140 comprises four elements, which combined provide significant improved temperature management and therefore increased life for high power-density machines. These elements of the TMS 140 include: Air Cooling, a Manifold Mini-Channel Heat Sink (MMHS), Pseudo Edge Wound windings (PEW) with optional high thermal conductivity padding between the stator windings and the AEPS 100 housing 110, and high temperature winding insulation provided by a high temperature tolerant thermally conductive electrical insulator.

Figure 1B:
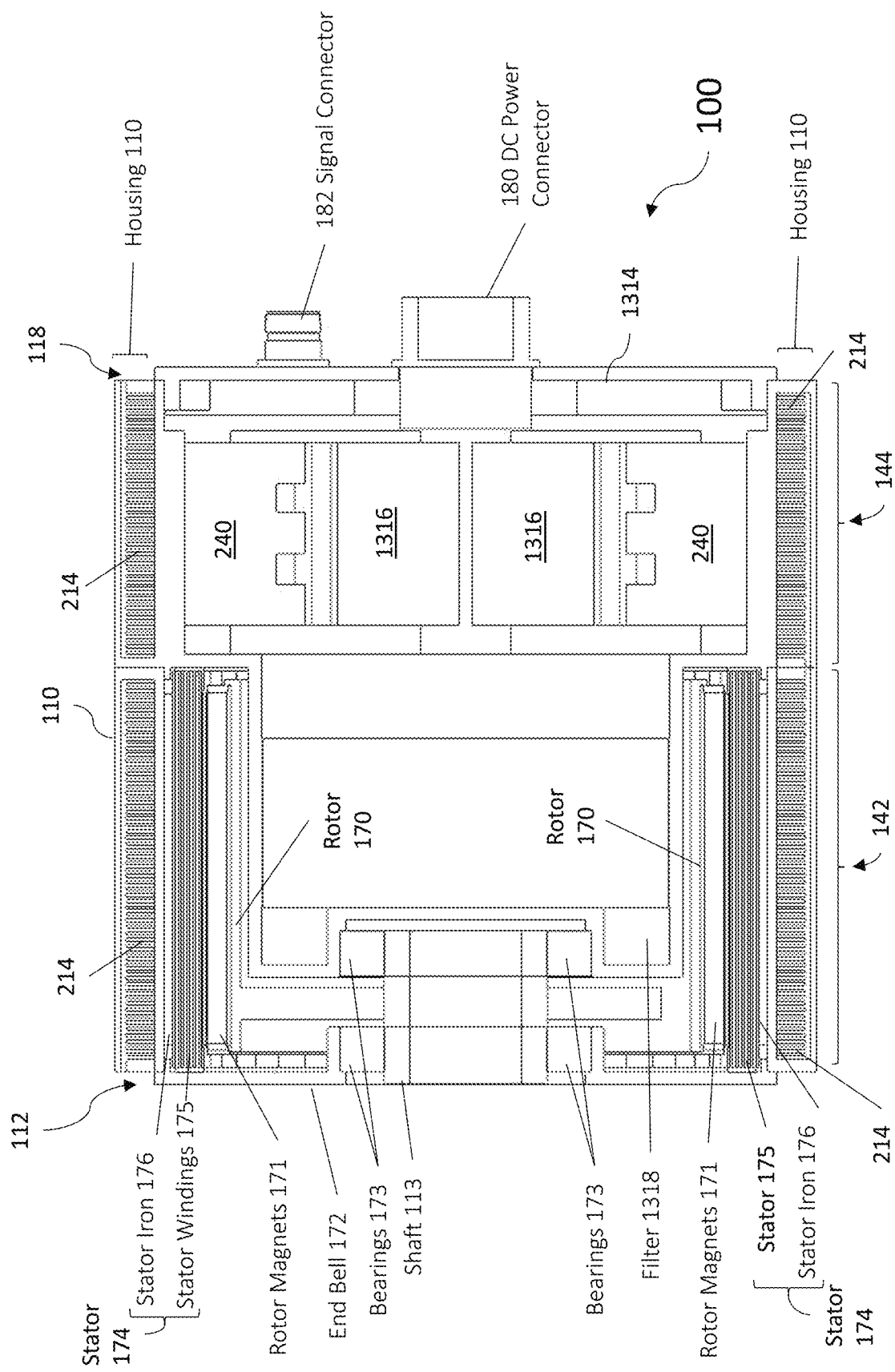
Figure 1C:
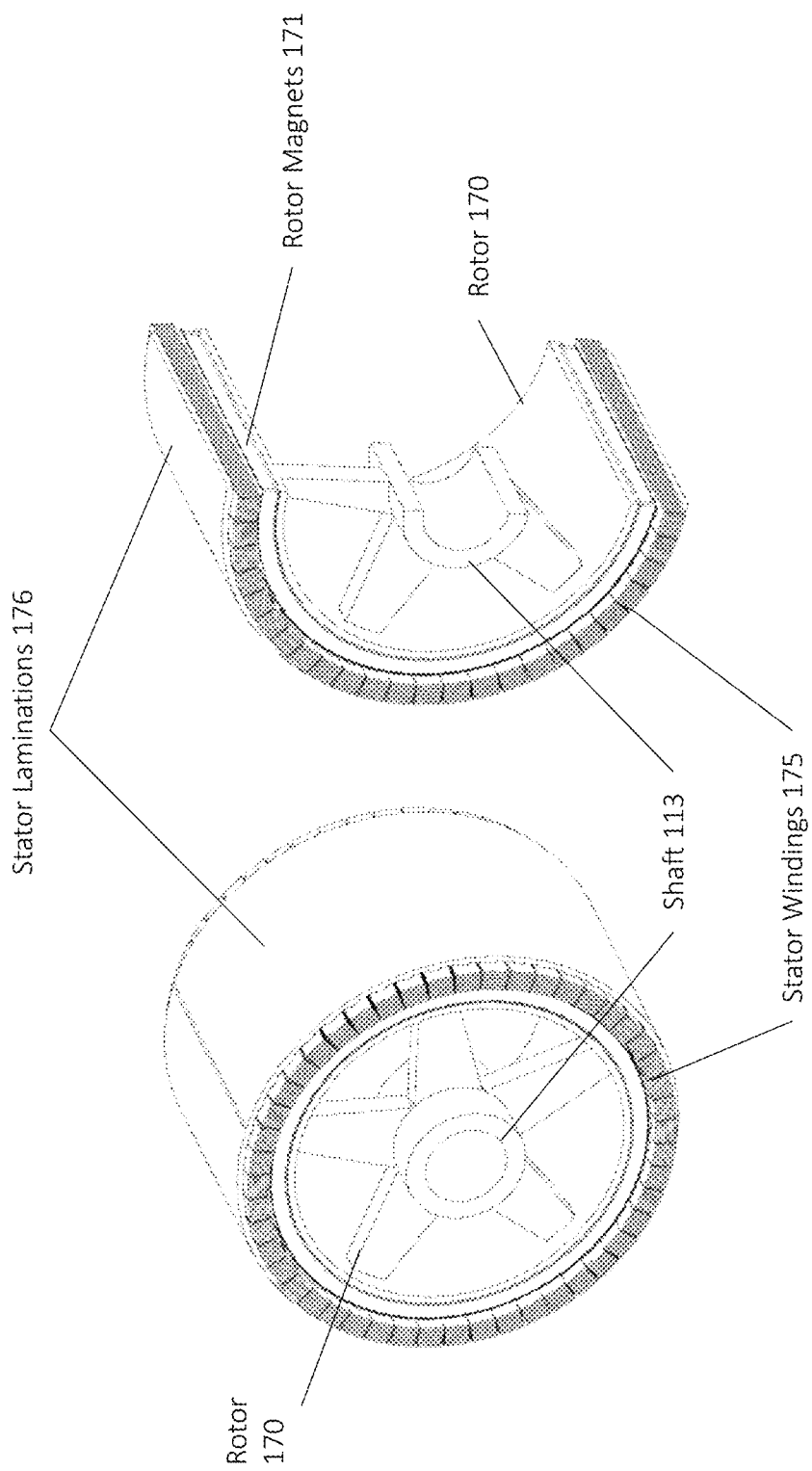

FIG. 1B is a cross-section diagram illustrating an example AEPS 100 and the various elements discussed in this disclosure. The electric motor 142 includes a rotor 170 that comprises a plurality of permanent rotor magnets 171 (which may be NeFeB magnets or other permanent magnets). The rotating shaft 113 of the electric motor 142 penetrates through the end bell 172 which seals the rotary 170 within the housing 110. The shaft 113 is supported by bearings 173. The stator 174 of the electric motor 142 comprises PEW stator windings 175 wound around a stator iron 176. As further discussed below, the housing 110 comprises circumferentially grooved micro-channels 214 of the TMS 140 for dissipating heat generated within the electric motor 142 section of the AEPS 100. The high temperature tolerant thermally conductive electrical insulator coating the stator windings 175 is thermally conducting to facilitate transfer of heat generated in the stator 174 to the housing 110. The motor drive 144 comprises power modules 240 that are operated by a DSP controller 1314 via a gate driver 1316. DC power may be fed to the motor drive 144 via a DC power connector 180 while control signals are input via a signal connector 180. Further shown in FIG. 1C are the stator windings 175 and stator laminations 176 of the stator 174, and shaft 113 and rotor magnets 171 of the rotor 170. In some embodiments, the structural elements of the rotor 170 and/or shaft 113 may comprise light-weight composite materials such as, but not limited to, a polyether ether ketone (PEEK) based composite material, Polyetherimide (Ultem), Polyamide-imide (Torlon), Polyimide (Vespel), Polyphenylene Sulfide (Ryton), Polyoxymethylene (Delrin), a plastic infused mesh or other fiber or plastic composite material.

Manifold Mini-Channel Heat Sink (MMHS): The MMHS integrates a novel air-cooled heat sink into the outer surface of the housing 110 of the AEPS 100. Air cooling reduces system complexity, improves system reliability, and reduces system mass by eliminating the need for auxiliary pumps and heat exchangers. An external air flow across and through the housing 110 provides an adequate heat sink for the AEPS 100. As shown in FIG. 1, an external air flow 103 (which flows both around the housing 110 and through the MMHS) is provided by a propeller 102 mounted to shaft 113 of the rotor 170 at the front 112 of the AEPS 100. That airflow 103 is further motivated by the velocity of the vehicle when it is in motion.

FIG. 1C illustrates an embodiment where an optional fan impeller 160 is attached to the shaft 113 of the electric motor 142 that will force/motivate an airflow 164 through the airflow channels 162 of the MMHS to either enhance or replace the airflow 103 from the propeller 102.

The MMHS concept disclosed herein has been shown to simultaneously reduce pressure drop and pumping power, thereby enabling use of smaller hydraulic diameter channels which can reduce thermal resistance. FIGS. 2A and 2B are front-view and rear-view sectionalized diagrams of the motor drive 144 section of the AEPS 100 of FIG. 1, illustrating an all air-cooled system which utilizes a manifold-mini-channel heat sink 200 integrated into the housing 110 of the AEPS 100. The manifold-mini-channel heat sink 200 includes an inlet manifold 210 that comprises a plurality of air inlets 212 (also shown in FIG. 1) formed in the housing 110 at the front 112 of the AEPS 100. Each of the air inlets 212 define an entry to an internal airflow passageways 162 within the housing 110 leading to a set of a plurality of circumferentially grooved micro-channels 214. The circumferentially grooved micro-channels 214 are formed in the housing 110 adjacent to, and conductively thermally coupled to, the stator windings 175 of the electric motor 142 and the power modules 240 of the motor drive 144. The manifold-mini-channel heat sink 200 further comprises an outlet manifold 220 that comprises a plurality of air outlets 222 formed in the housing 110 at the back 118 of the AEPS 100. Each of the plurality of air outlets 222 are coupled by an internal airflow passageway within the housing 110 to the respective set of the plurality of circumferentially grooved micro-channels 214. As such, in operation, airflow 103 entering an air inlet 212 flows through the circumferentially grooved micro-channels 214 in both the electric motor 142 and motor drive 144 sections, and exhausts from the housing 110 at an air outlet 222. In some embodiments, power modules 240 (discussed below) are thermally coupled to an internal mounting surface 230 of the motor drive 144 to dissipate heat via the manifold-mini-channel heat sink 200.

The micro-channels 214 reduce thermal resistance due to their very high surface area to volume ratio. By including in the MMHS 200 a plurality of parallel shorter airflow channels (i.e., from an inlet 212 air passage, through the micro-channels 214 and to an immediately adjacent outlet 222 air passage), the effects of pressure drop and pumping power are mitigated. In some embodiments, heat sink grooves cut circumferentially (rather than axially) within the material of the housing 110 form the circumferentially grooved micro-channels 214. The MMHS 200 improves performance as an air cooled heat sink. Because of the simultaneous reduction in both flow rate and flow distance, the pressure drop and pumping power reduces by the square of the number of divisions. Thus, manifolding channels in this way facilitates use of smaller hydraulic diameter channels 214 and the associated increase in heat transfer surface area, without the associated increase in pressure drop and pumping power. Alternatively, for the same channel dimensions, the pressure drop, pumping power, and thermal resistance can be reduced, and the heat transfer coefficient and coefficient of performance (COP) can be increased. Obtaining lower thermal resistances at higher COPs is particularly advantageous for high specific power electric motors, where the weight and pumping power of the heat sink solution are minimized.

Figure 3:
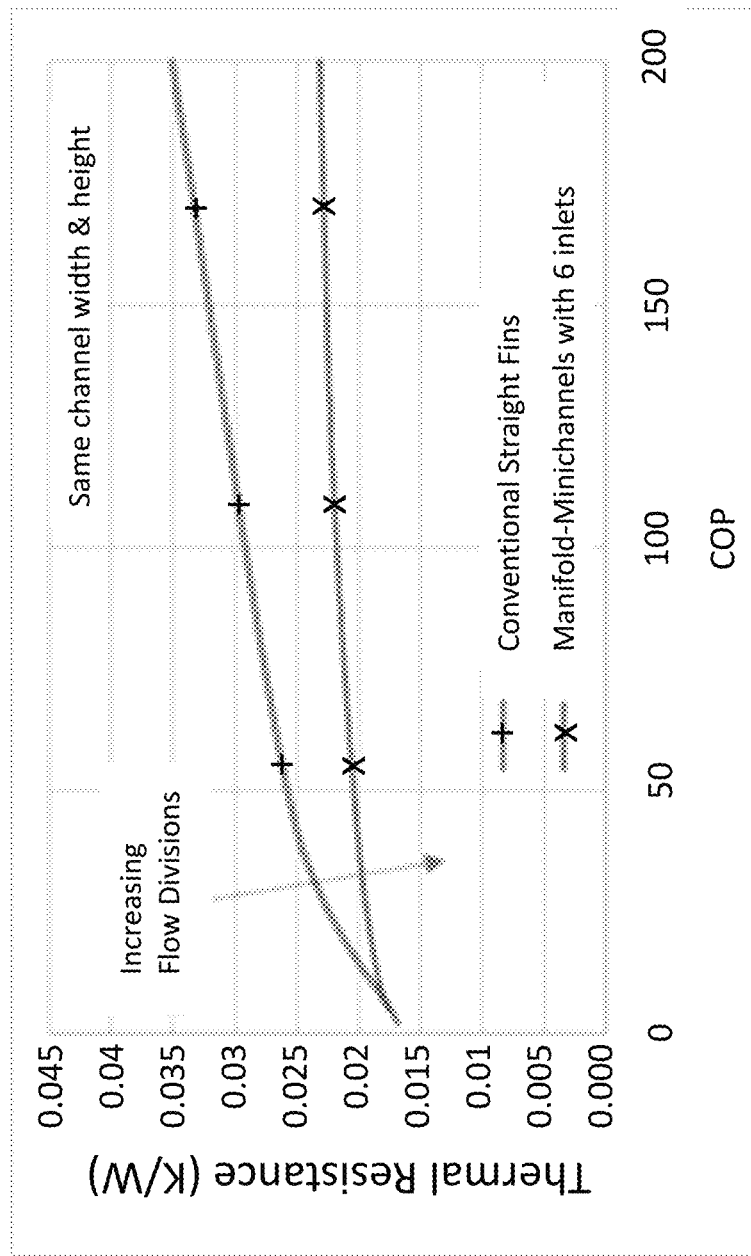
FIG. 3 is a graph illustrating a preliminary comparison of a conventional mini-channel heat sink and a manifold-mini-channel heat sink.

A preliminary comparison of a conventional mini-channel heat sink and a MMHS 200 with the same mini-channel dimensions is given in FIG. 3. The results indicate that the manifold mini-channel has significantly lower thermal resistance for the same COP. The results indicate that the MMHS has significantly lower thermal resistance for the same COP. In addition, a 3-D Finite Element Analysis (FEA) model of a MMHS 200 was created. Due to the periodic nature of the flow, only $1/12$ of the total domain was simulated. Based on preliminary and full 3-D FEA models, the predicted performance of the MMHS 200 is given in Table 1 for typical take-off and cruise conditions. Total thermal resistance includes the

TABLE 1

Predicted performance metrics for the

| Metric | Take-Off | Cruise |
| --- | --- | --- |
| Mass Flow Rate [kg/s] | 0.5 | 0.235 |
| Pressure Drop [Pa] | 840 | 260 |
| Heat Transfer Coefficient [W/m²-K] | 800 | 700 |
| Caloric Thermal Resistance [K/W] | 0.0017 | 0.0042 |
| Convective Thermal Resistance | 0.0057 | 0.0065 |
| COP [—] | 40 | 100 | internal conductive resistance between the heat sources and the heat transfer surfaces, the convective resistance between heat transfer surfaces and fluid, and caloric resistance of the fluid.

Pseudo-Edge Wound (PEW) Windings: In some embodiments, the electric motor 142 of the AEPS 100 comprises Pseudo-Edge Wound (PEW) Windings 175 on the stator 174 for reducing the thermal resistance in the AEPS 100 electric motor from the stator winding 175 copper of the electric motor 142 to the structure of the housing 110 cooled by the MMHS 200. In some embodiments, the windings 175 are PEW copper windings. See, for example, U.S. Pat. No. 10,062,497 "PSEUDO EDGE-WOUND WINDING USING SINGLE PATTERN TURN"; U.S. patent application Ser. No. 16/997,720 "ELECTRIC MACHINE STATOR WINDING"; and U.S. patent application Ser. No. 16/442,144 "INTEGRATED TRACTION DRIVE SYSTEM", each of which are incorporated herein by reference in their entirety. Electric motor windings typically comprise round wires formed into bundles that make it very difficult to get the heat out from the stator windings even at the winding end turns where heat is able to dissipate from the windings. For embodiments for the present disclosure, the PEW winding configuration of the stator windings 175 comprises segments of bar-type windings where the ends are flat, and a thermal pad (such as an electrically insulating silicone thermal interface material "Sil Pad", for example) can optionally be placed against the winding end turns and housing walls to facilitate a thermal conductive heat path (i.e., a low thermal resistance path) from the windings 175 to the housing 110. The PEW winding configuration also comprises a segmented winding arranged such that at each turn of the stator windings 175 has access to a conductive thermal path to the housing 110. The resulting structure is very efficient for moving heat from the electric motor 142 to the housing 110 where it can be efficiently discharged to the environment by the airflow through the MMHS 200. The PEW windings 175 of stator 174 provide a much higher percentage of winding material (for example, copper) by volume, and vastly improves the thermal conductivity through the stator windings 175, as compared to conventional wound wire bundles with their relatively low copper content by volume. A stator 174 with PEW copper windings also increases the effective thermal conductivity and uniformity of the stator windings 175, resulting in at least an order of magnitude reduction in winding thermal resistance compared with typical wire-bundle approaches. It should be understood that although the use of copper is mentioned as the material for the stator windings 175 throughout this disclosure, any of these embodiments may instead use windings made of other electrically conductive metals or alloys.

Figure 4:
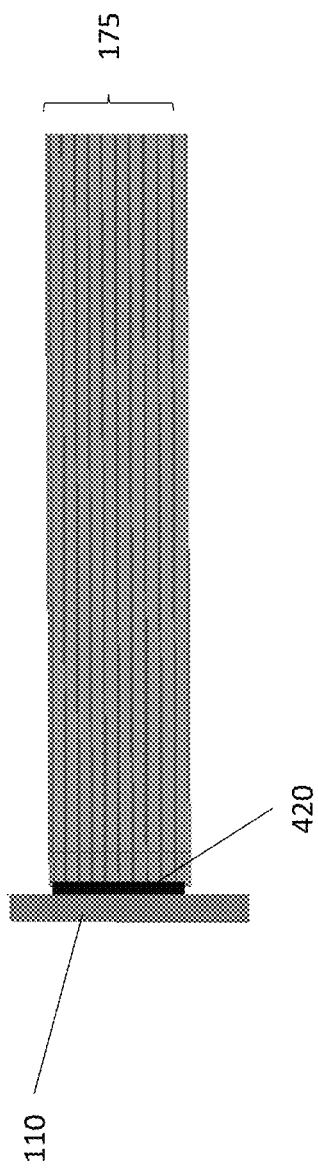
FIG. 4 is a diagram that illustrates a section of PEW stator windings with a high thermal conductivity pad between the windings the AEPS housing.

In some embodiments, a thermal management feature optionally used in combination with the PEW copper windings is the use of high thermal conductivity padding, for example "SIL PADS", at the ends of each copper winding bundle to facilitate heat rejection from the heat-generating copper of the stator windings 175 to the AEPS 100 actively cooled (via the MMHS 200) housing 110. FIG. 4 illustrates a section of PEW copper stator windings 175 where a high thermal conductivity pad 420 is pressed in to contact both the windings 175 and the AEPS housing 110. This arrangement greatly reduces overall thermal resistance as compared to conventional round copper windings. FIG. 11, discussed below, similarly illustrates a partial PEW stator configuration where for each of the illustrated lamination stack, high thermal conductivity padding 420 establishes a thermally conductive path between the windings 175 and the end bell 172 to reduce thermal resistance.

High Temperature Tolerant Thermally Conductive Electrical Insulation: In some applications, an AEPS 100 can be subject to a wide power requirement. For example, for an aircraft application an AEPS 100 may consume 166 kW at cruise but have peak demands on the order of 500 kW. In order to avoid the need for a bigger and heavier electric motor 142 to handle the peak conditions, the thermal management system needs to be able to handle the excess heat dissipation at peak demand conditions. Accordingly, in some embodiments, high temperature insulating layers are used for the PEW stator winding 175 arrangement, with nearly twice the temperature capability of typical varnishes. Instead of the electrically insulation layers (varnish) found in typical wire-bundle approaches, the electric motor 142 comprises electrically insulation layers comprising a much higher temperature-tolerant thermally conductive electrical insulation, which in some embodiments may be applied to the stator windings 175 as a coating. For some embodiments, the high temperature tolerant thermally conductive electrical insulator may comprise an insulated wire technology such as the Honeywell Inc. Hight-Temperature Wire Insulator (HTI).

The high temperature tolerant thermally conductive electrical insulation provides a high thermal conductivity heat path from the PEW stator winding 175 to the stator iron 175 and housing 176 so that heat generated in the stator windings 175 can be directed to the MMHS 200 and dissipated into the environment. Moreover, this insulation is referred to a "high temperature tolerant" because the insulation material itself can tolerate very high temperatures without degradation. In some embodiments, the insulation is tolerant to temperatures of 220° C. or greater and in some embodiments from 280° C. up to 600° C. which is much greater than what expected temperature would in the material of the PEW stator winding 175. In some embodiments, the insulator may be tolerant to temperatures exceeding the melting temperature of the material of the PEW stator winding 175 (e.g., up to the 1084° C. melting point of copper for copper windings).

In some embodiments, the high temperature tolerant thermally conductive electrical insulator is produced from a formulated wire liquid coating comprised of glass solids suspended into a solution. Such an insulator can be tolerant to temperatures of 1200-2000° C. That solution may include surfactants, solvents, and polymers. The resulting liquid coating can be used to coat single strand magnetic wire, using typical industrial methods, to form the stator windings 175. In some embodiments during the application of the high temperature tolerant thermally conductive electrical insulator to the stator windings 175, the liquid coating is cured at low temperature to enable the coated wire to be applied to EM assemblies and machines in the same manner as polyimide coated wire. The resulting coating of the cured solution of suspended glass solids, is durable and can be manipulated without damage during assembly. In some embodiments, once the assembly is completed, a final heat curing "firing" is performed to set the final chemistry to remove all carbon chemistry making it capable of operating at 540° C. with long term exposure with suitable durability and electrical insulation performance. This coating can handle temperatures of 400° C. for prolonged operating periods. The conventional wire bundle approach can handle temperatures only of about 220° C. for prolonged periods. Considering that the approximation for predicting life of copper/insulation systems assumes a doubling or halving of system life for every 10° C., this is a significant improvement in capability.

High temperature capability is achieved by using the high temperature tolerant thermally conductive electrical insulator to coat single strand magnetic electrical wire due to the oxidation protection for the winding conductors. The wire coating is capable of 540° C. and is superior to polyimide for dielectric protection for temperature exposure beyond 10K hours. In some embodiments, the dielectric performance is equivalent to polyimide up to 220° C. and maintains the protection up to 540° C. This is 320° C. beyond the capability of polyimide. Electrical conductivity is identical to typical magnetic copper wire that are coated with polyimide. Thus, no additional windings or larger wire gage application is necessary for EM components. The coating is resistant to high frequency exposure of pulse width modulation controllers. Degradation of polyimide dielectric performance in the stator windings 175 can thus be avoided.

Figure 5:
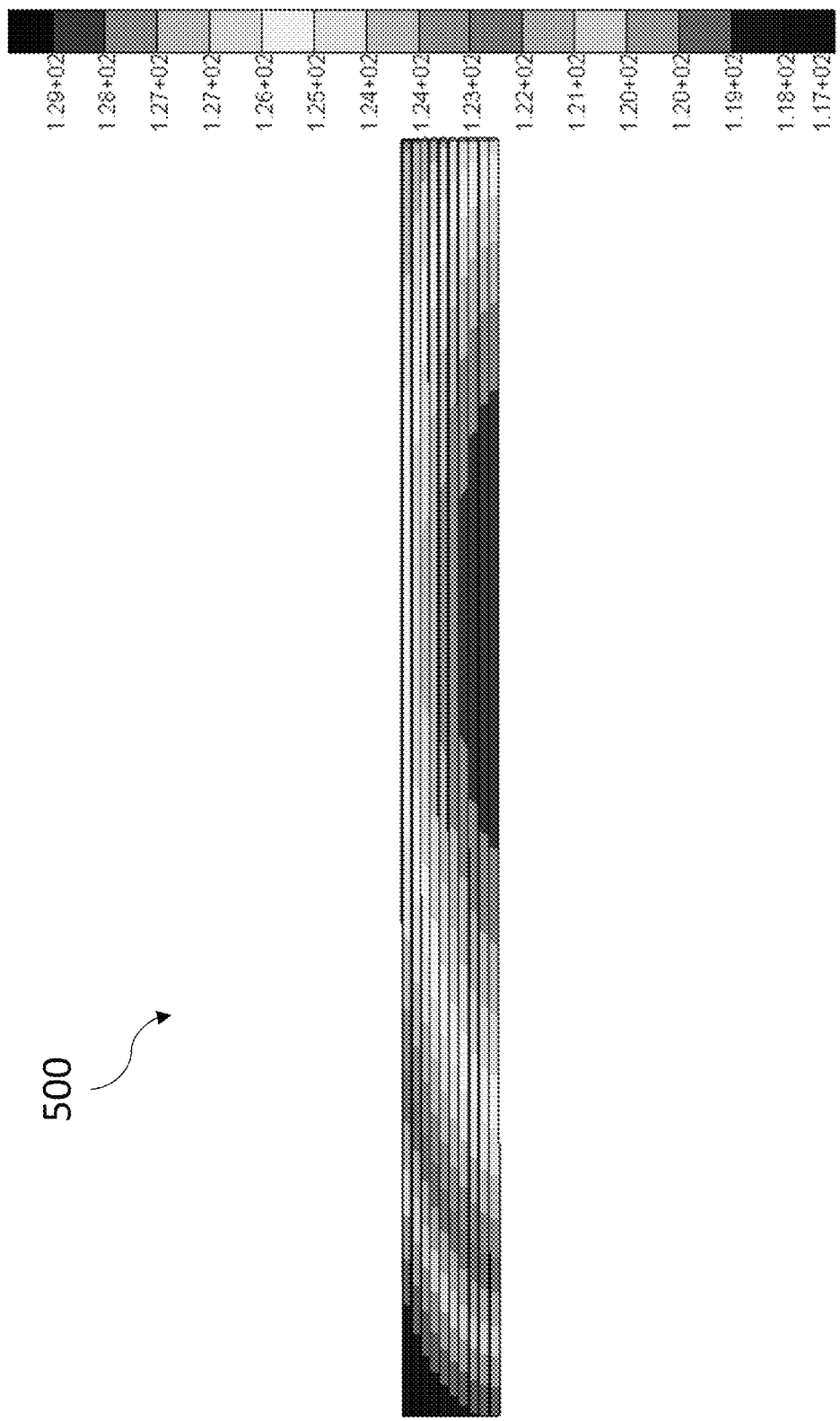
FIG. 5 is a diagraming that shows a small total temperature gradient due to benefits of PEW.

Notable characteristics of high-power electric machines such as motors and generators are the highly orthogonal thermal conductivity of the wire bundles and the temperature dependence of the $I^2R$ losses generated by the current in the wires. Failure to properly account for these characteristics can lead to significant temperature prediction error. In the TMS 140 disclosed herein, the orthogonality of the thermal conductivity in the copper is nearly eliminated using the PEW stator windings 175. FIG. 5 is a diagram at 500 that shows a small total temperature gradient with copper stator windings 175 is only about 12° C., which is due to benefits of PEW. The volume occupied by the copper windings is so much more efficiently utilized that the thermal resistance within the windings is greatly reduced. Temperature gradients and internal peak temperatures are accordingly reduced.

The temperature dependence of the losses in copper stator windings 175 is modeled by adjusting the local heat generation in the copper as a function of the local temperature. As noted in Table 2, the reference temperature for the copper losses in a machine evaluation was set at 220° C., and the losses are reset within the model as part of the solution.

TABLE 2

Operating Conditions for Thermal Evaluation of the AEPS

Key Parameters for Transient and Continuous Conditions

|  | Peak 1 min | Peak 5 min | Peak 10 min | Peak 15 min | Peak 20 min | Continuous |
|---|---|---|---|---|---|---|
| copper losses, W (@220 C.) | 18243 | 8169 | 4232 | 2716 | 1878 | 3763 |
| iron losses, W | 4093 | 3504 | 3150 | 3012 | 2935 | 1955 |
| module losses, W | 3452 | 1789 | 1067 | 767.5 | 595 | 960 |
| windage and bearings estimate, W | 125 | 125 | 125 | 125 | 125 | 125 |
| total, W | 25913 | 13587 | 8574 | 6620.5 | 5533 | 6803 |
| air flow thru MC heat sink, kg/sec | 0.50 | 0.43 | 0.37 | 0.30 | 0.24 | 0.24 |
| air Taverage in MC heat sink, ° C. | 39 | 50 | 41 | 36 | 32 | 34 |

This model was used for predicting temperatures throughout the AEPS 100, both at the continuous flight condition and through a transient simulation of a 20-minute takeoff condition.

Figure 6:
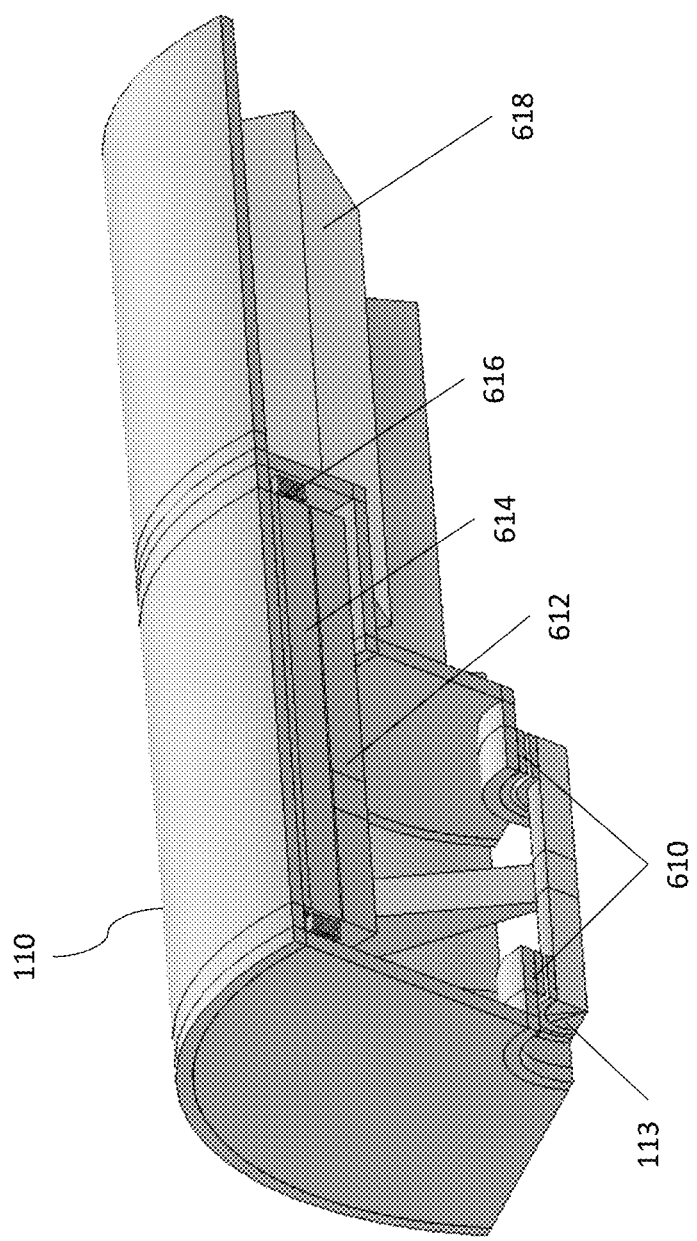
FIG. 6 illustrates a thermal model that simulates a ⅓ circumferential section of an example Advanced Electric Propulsion System embodiment.

This thermal model used for evaluation simulates a ⅓ circumferential section of an AEPS 100 (as shown in FIG. 6) by taking advantage of the symmetry around the axis of the AEPS shaft 113. All significant internal heat sources are modeled including heat generated in the stator 174 copper layers, the stator laminations 176, the inverter modules, windage generation between the rotor and stator, and estimated bearing losses. The model provides credible verification that the advantages expected to be obtained from the TMS 140 do indeed combine to produce a viable, survivable device to handle the desired great increase in overall power density. FIG. 6 shows several of the AEPS 100 components included in the thermal model, which includes ⅓ of the total circumference of the actual AEPS 100 device. In addition to the housing 110, other modeled AEPS 100 components include the bearings 173 for the shaft 113 and the rotor 170 of the electric motor 142, stator laminations 614, stator windings 616 and the inverter 618 of the motor drive 114.

The thermal analysis simulation assumes that the outside air heat sink is at a standard hot day condition of 39.4° C. at sea level when the transient takeoff simulation begins. The completion of the 20 minutes transient takeoff simulation is assumed, for thermal analysis purposes, to be 3.0 km altitude at which the standard hot day temperature is 20° C. Higher altitudes will benefit from lower ambient air temperatures and will be increasingly benign for AEPS inner temperatures. Using these ambient air temperatures and the air flow rate through the microchannel heat sink, the average temperature of air through the heat sink was calculated based on the total heat rejection from the AEPS 100. This average air temperature was used for the ambient heat sink effective temperature. For the initial one-minute peak transient, however, the ambient temperature of 39.4° C. was used for the heat sink since the great majority of heat generation during that short period is accounted for by the heat capacity of the AEPS 100 mass.

Figure 7:
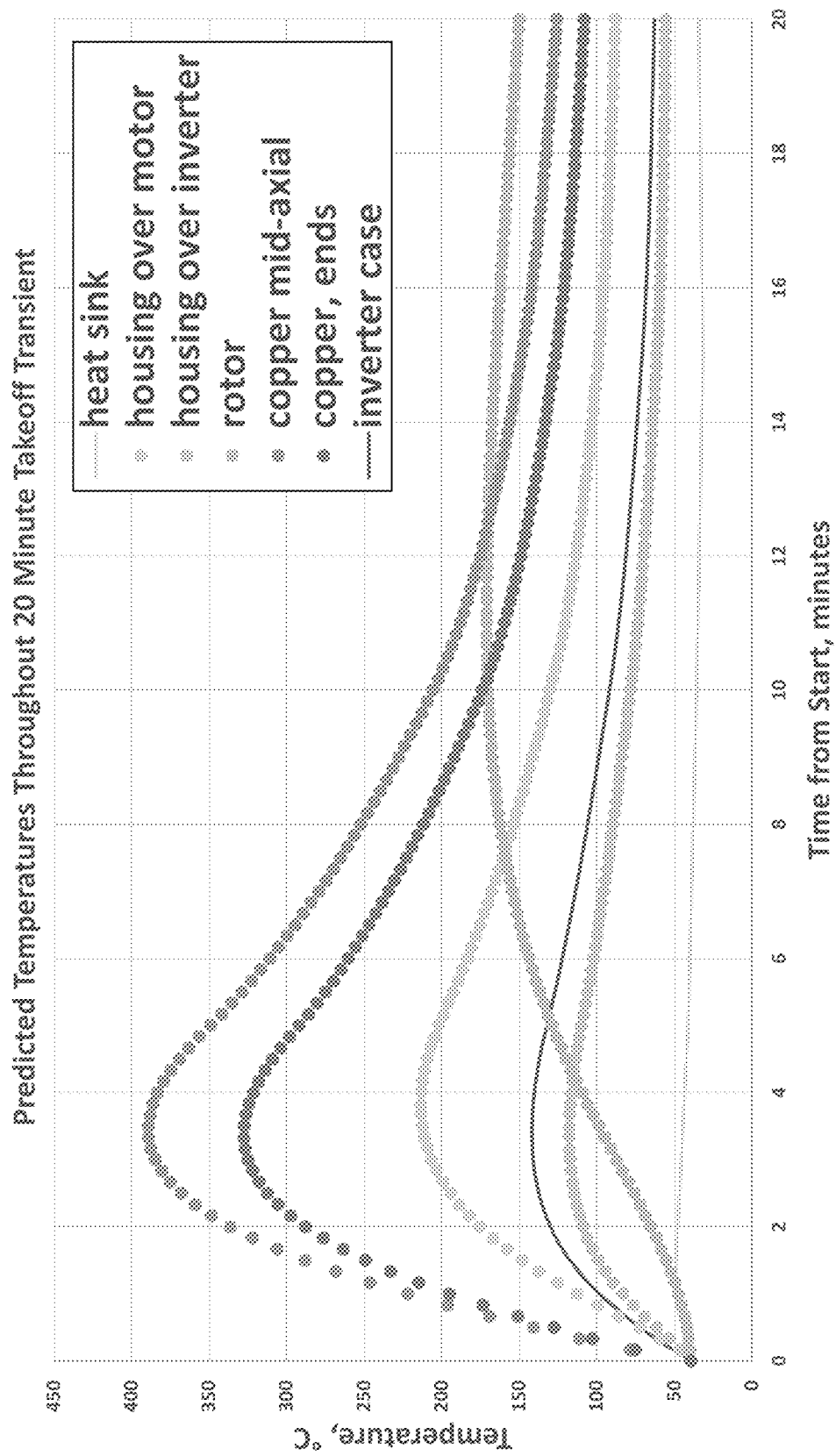
FIG. 7 illustrates predicted temperatures in an example Advanced Electric Propulsion System embodiment throughout a 20-minute takeoff transient simulation.
Figure 8:
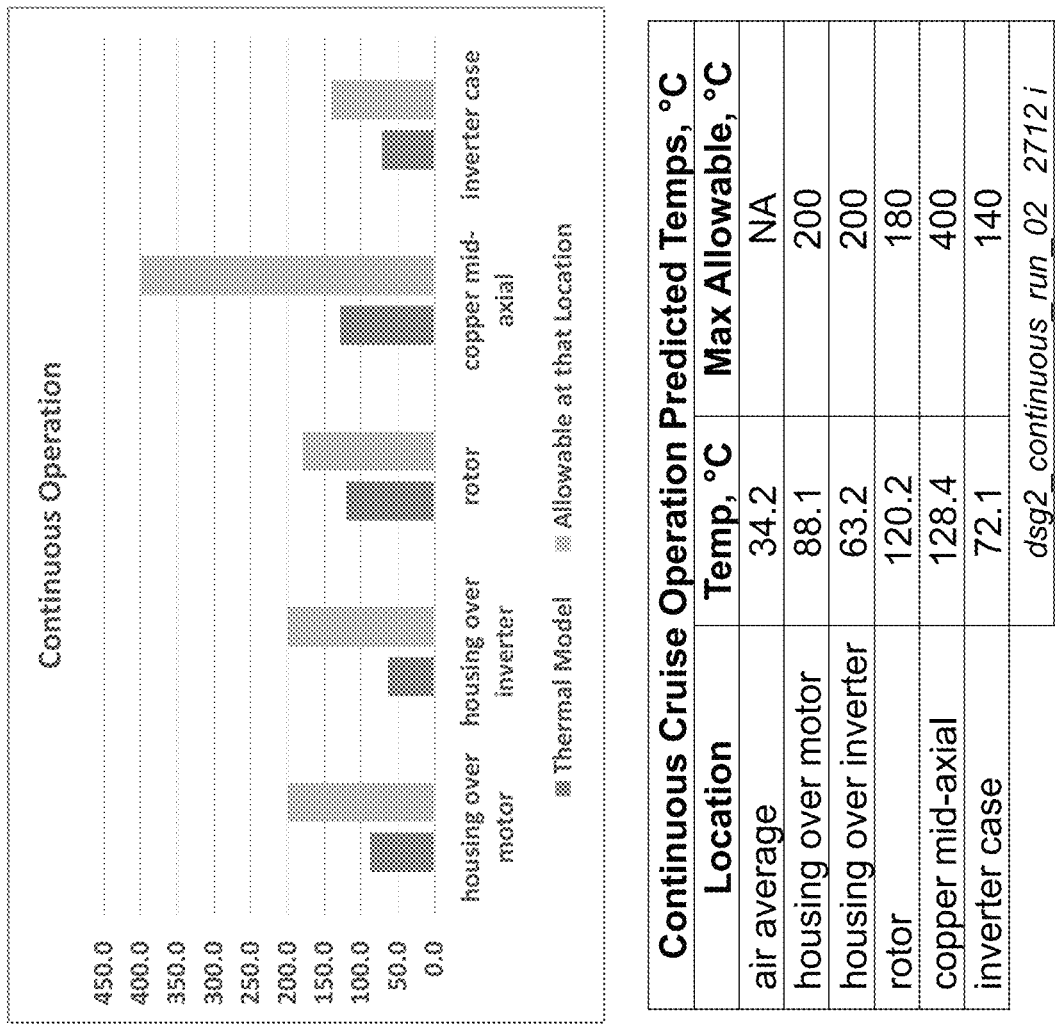
FIG. 8 illustrates predicted temperatures at relevant locations of an example Advanced Electric Propulsion System embodiment at a stabilized, steady operation condition at an assumed 3.0 km operating altitude.

Table 2 also shows the operating conditions and associated losses through the various timed phases of a takeoff transient, and the continuous operating condition. The estimated air mass flow rates and the air heat sink temperatures used for analysis are also shown. FIG. 7 shows the predicted temperatures in the AEPS throughout the 20-minute takeoff transient simulation. The copper temperature briefly reaches a maximum temperature of 392° C. at about 3.5 minutes, remaining below the maximum allowable temperature of 400° C. The rotor with its PM magnets briefly reaches about 170° C. at 12 minutes, remaining below its maximum allowable temperature of 180° C. The inverter case reaches maximum allowable temperature of about 140° C. at 3.5 minutes. FIG. 8 shows the predicted temperatures at relevant locations at a stabilized, steady operation condition at the assumed 3.0 km operating altitude. For this long-term operating condition, all relevant temperatures are well below maximum desired values. This will provide long operating life and high reliability. Table 3 shows the resultant thermal resistances achieved by the proposed TMS 140 at takeoff and at continuous cruise.

TABLE 3

Thermal Resistances at Takeoff

| Thermal Resistances, K/W | Take-Off | Cruise |
| --- | --- | --- |
| Caloric Resistance | 0.0017 | 0.0042 |
| Convective Resistance | 0.0057 | 0.0065 |
| Conductive Resistance | 0.036 | 0.036 |
| Overall Thermal Resistance | 0.0434 | 0.047 |

Electric Motor Design

The electric motor 142 of AEPS 100 includes an air-cooled permanent magnet (PM) motor that utilizes the TMS 140 for thermal cooling as discussed above. In some embodiments, to limit the amount of stator iron 176 in the stator 174, the electric motor 142 comprises a multi pole/multi-slot Halbach array electric rotating machine. The rotor 170 of the electric motor 142 may include multiple high mega-gauss oersteds (MGO) magnets 171 contained within a composite sleeve resulting in reduced rotor 170 losses and smaller airgap. In some embodiments, the rotor 170 structure comprises a composite material, offering improved mechanical stress capabilities and drastic weight reduction of the entire rotor assembly. The stator 174 of the electric motor includes concentric windings 175 and use the PEW winding arrangement discussed above, which can improve the fill factor of the slot by as much as 100%.

Figure 9:
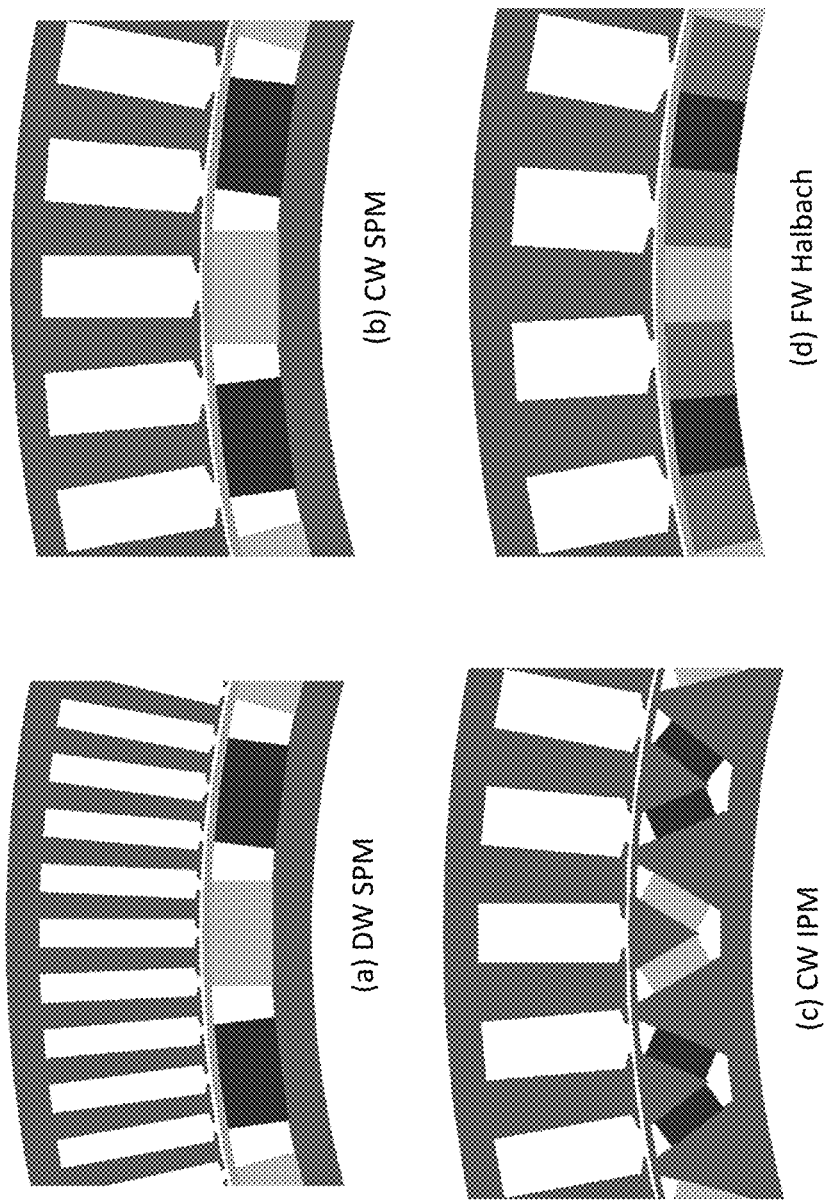
FIG. 9 illustrates example alternate electric motor topologies an example Advanced Electric Propulsion System embodiment.
Figure 10:
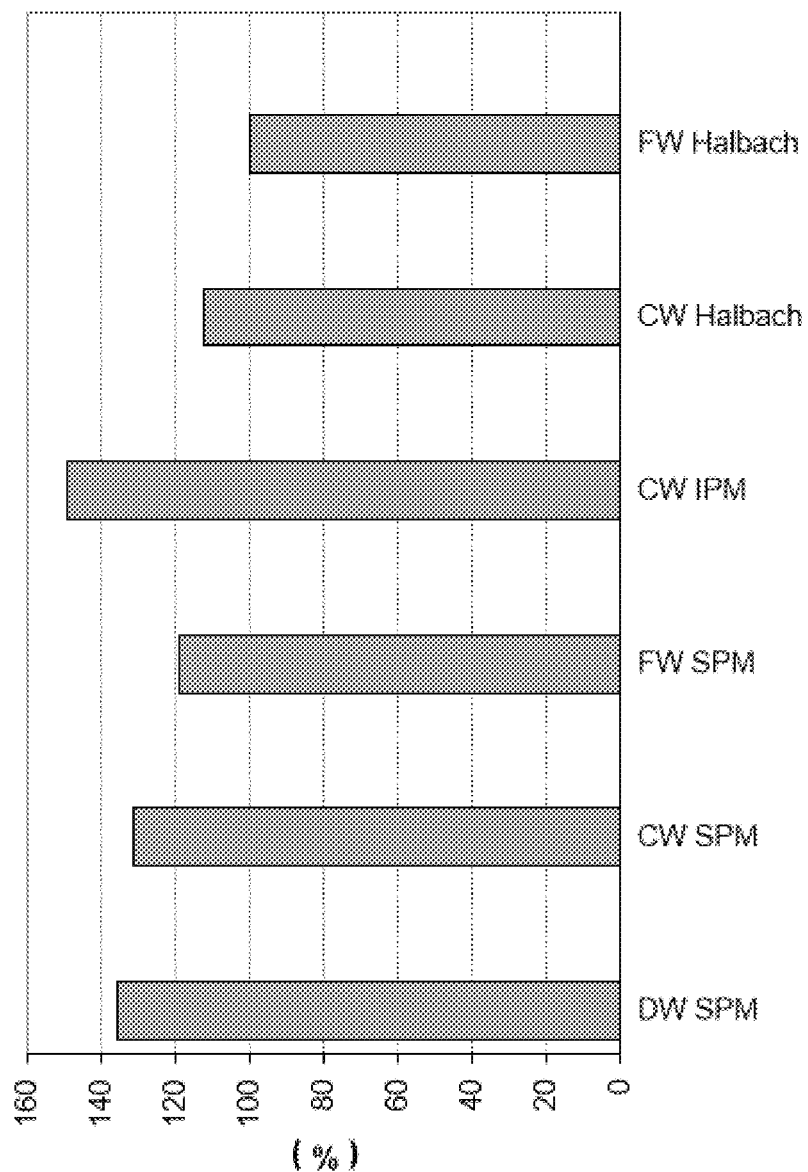
FIG. 10 is a chart of Electromagnetic (EM) weight comparisons.

In alternate embodiments, various other types of PM motors may be utilized to implement a low speed, high pole count, direct drive electric motor 142 for the AEPS 100. Example alternate motor 142 topologies (illustrated in FIG. 9) may include (a) surface PM rotor with distributed winding (DW SPM, 48 poles 144 slots), (b) surface PM rotor with concentrated winding (CW SPM, 48 poles, 72 slots), a surface PM rotor with fractional slot winding (FW SPM, 48 poles, 54 slots), (e) interior PM rotor with concentrated winding (CW IPM, 48 poles, 72 slots), (d) Halbach array with concentrated winding (CW Halbach, 48 poles, 72 slots), and Halbach array with fractional slot winding (FW Halbach, 48 poles, 54 slots). It should be understood that these are non-limiting examples and in other embodiments, other motor topologies may be utilized for the AEPS 100. FIG. 10 provides a comparison of Electromagnetic (EM) weight (weight of active magnetic materials including electrical steel, copper winding, and magnets). Weight of the FW Halbach topology machine is lower than that of other PM topology motors. The result shows that the torque density of the Interior Permanent Magnet (IPM) motor is not better than FW Halbach topology for very high pole count applications. A motor with fractional slot winding produces more torque than motor with concentrated winding because of its higher back-emf constant.

In some embodiments, the stator windings 175 of the electric motor 142 use the PEW winding arrangement, which improves the copper fill factor of the slots by 100% compared to that of round magnet wires. An example arrangement of the PEW windings for one embodiment is shown in FIG. 11. To achieve the utilization of higher voltages above 5 kVdc, the high temperature tolerant thermally conductive electrical insulator is applied to the wire elements of the stator to operate continuously up to 400° C. The insulator is used in some embodiments to precision bond laminations together for the electric motor stator core. The formulation may be applied to the stator windings 175 wire using a conventional factory setting and is configured to allow normal handing and winding machine operation to accomplish motor assemblies. The coated finished wire size is equivalent to standard polyimide coated wire to allow conventional machine sizing.

EM Design of Direct Drive Motor. FIG. 12 shows an example embodiment of an electric motor 142 topology 1200 that comprises a 3-phase PM motor with Halbach array. The stator 174 lamination uses cobalt-iron electrical steel for high value of magnetic saturation. The stator winding 175 in each phase includes 16 turns of PEW single tooth coil. The rotor 170 comprises of 38 MGOe NdFeB segmented magnets contained within a Carbon Fiber Reinforced Polymer (CFRP) sleeve resulting in reduced rotor losses and smaller airgap.

Motor Drive (Power & Signal Electronics)

The function of the motor drive 144 is to convert DC input power (e.g. from the vehicle's battery) to variable AC voltage and variable AC frequency to drive the electric motor 142. The motor drive 144 is integrated with the electric motor 142 and TMS 140. In some embodiments, AEPS 100 includes a motor drive 144 comprising power electronics that includes a three-phase multi-level inverter 1310 as shown in FIG. 13. That is, while FIG. 13 illustrates a two-level inverter, in other embodiments the inverter 1310 may comprise more than two inverters. In some embodiments, a high voltage bus (for example, of 3-5 kV or more) is utilized to reduce electrical current demand of the motor drive 144 inverter 1310 for very high-power vehicle applications (such as the all-electric propulsion system for narrow-body aircraft, for example.) Electric propulsion vehicles can draw 10 MWatts to several hundred MWatts of electric power that will result in significant weight and efficiency penalties if low bus voltage is used. In some embodiments, the three-phase multi-level inverter comprises SiC MOSFET power devices 1312 (which may be for example, SiC MOSFET (Silicon Carbide metal-oxide-semiconductor field-effect transistor), IGBT (Insulated Gate Bipolar Transistor) or GaN (Gallium Nitride) power devices) to achieve substantial improvements in high voltage, high power levels and cost reduction. In some embodiments, the power devices 1312 act as electronic switches (controlled by the gate driver and DSP controller) that chop the incoming DC voltage converting it to a variable frequency and voltage AC signal. In some embodiments, the power devices 1312 are positioned in the power modules 240 (as shown in FIGS. 1B, 2A, and 2B). In some embodiments, each power module 240 is associated with a single AC power phase. In other embodiments, the six power devices 1312 that supply 3-phase AC power are comprised within a single power module 240. As such, the power module(s) 240 operate to provide 3-phase AC power to each stator winding. Additional modules may be used for applications where the stator winding draws more AC power that can be supplied by a set of six power devices 1312. In some embodiments (as shown in FIG. 1, for example) the power modules 240 for power stator windings may be mounted to one or more of the stator winding stacks (shown in FIGS. 2A and 2B) to provide a conductive heat path for heat dissipated by the power devices 1312 to be conducted to the housing 110 that is cooled by the MMHS 200 as discussed above. In other embodiments, power modules 240 may be elsewhere positioned within the AEPS 100 where a conductive heat path is present for heat dissipated by the power devices 1312 to be conducted to the housing 110.

The signal electronics of the motor drive 144 comprises a digital signal processing (DSP) controller 1314 that executes sensor-less control and protection algorithms that control firing of the power devices 1312 via gate driver 1316. The DSP controller 1314 may send and receive control instructions, messages, and other I/O data (such as vie an RS-422 interface) with other components and systems of the vehicle 10 and in some embodiments control operation of the motor drive 144 (and thus control the AEPS 100) in response. In some embodiments, the DSP controller 1314 further executes prognostics, diagnostics, and health monitoring. In some embodiments, the processing power of the DSP controller 1314 can be used for heavy implementation of aircraft connectivity with opportunity for implementation of artificial intelligence. As shown in FIG. 13, the motor drive 144 may comprise a DC-link/EMI filter 1318, switching power devices 1312, voltage and current sensors 1320 and signal control electronics. The components for this high voltage application are discussed in more detail below.

Inverter Topology. In some embodiments, wide band gap power devices (such as but not limited to, SiC or Gan MOSFETs or IGBT power devices), may be used to implement the inverter function 1310 of motor drive 144. The SiC MOSFET has been shown to be much more efficient than Si IGBT due to the significant lower switching losses of the SiC MOSFET. A three-level inverter uses more switches and is more complex, resulting in lower power density of the inverter compared to the two-level inverter. The volume of the three-level inverter is bigger than the volume of the two-level inverter due to space for connecting the additional switch per motor phase. As an example, high voltage devices for 6.5 kV and 10 kV allows use of a two-level inverter in the proposed 5 kV DC link voltage.

DC-link Capacitor. In some embodiments, the motor drive 144 includes a DC-link EMI filter 1318, to filter the heavy high frequency DC-link current harmonics and protecting the high voltage battery 1330. The capacitors of the filter 1318 are affecting the switching losses of the inverter 1310 helping at the same time the thermal behavior and the efficiency of the system. Two different filter technologies are explored for this application: ceramic and film capacitors. Ceramics are more sensitive to a single point failure, more sensitive to mechanical stress, and more expensive, but offer higher capacitance density due to higher dielectric constant. Going to high DC-link voltage approach helps to reduce thermal stress on capacitor due to lower RMS current that needs to be handled for the same power level and to use lower capacitance value due to higher switching frequency of the SiC MOSFET 1312 components.

Gate Driver Design Considerations. The DC/AC converter part (i.e., inverter 1310) that is a direct link between the high voltage (high power level) and the low voltage (signal level) electronics is the gate driver 1316. Additional insulation features between DSP signal level PBA, PWM outputs, and Gate driver BA outputs could be achieved using optical coupling isolation or $SiO_2$ capacitive isolation technology implemented on a single chip gate driver circuit. The current sensing of motor phase currents may be implemented by using current sensing resistive shunts (such as 200 µohm/12 W as an example) that are equipped with galvanically isolated voltage sensing.

Integrated Powertrain (Mechanical & Electrical) In some embodiments, the AEPS 100 comprises a single highly integrated powertrain. The powertrain system includes the three subsystems detailed in the previous sections, the TMS 140, the electric motor 142, and the motor drive 144. The AEPS 100 packaging design has an overall objective to minimize physical size while maximizing thermal efficiency.

In some embodiments, an aluminum motor and controller housing 110 direct the incoming air from an axial direction to a radial direction increasing heat rejection. Referring to FIG. 11, the heat conduction for the motor stator 174 has two paths. Heat generated in the steel laminations 1120 mainly conducts directly into the back iron 1110 of housing 110 beneath the circumferentially grooved micro-channels 214 of the MMHS 200. The heat generated in the stator windings 175 mainly conducts axially to the magnesium end bell 172 and to housing 110. By controlling the manufacturing dimensions of the components and using a thermally conductive pad 1150 between the windings 175 and the end bell 172, the thermal resistance is minimized. Once the heat from the stator windings 175 is transferred into the end bell 172 and housing 110 it then conducts to the heat exchanger MMHS 200 and dissipated into the environment. Additive manufacturing can be employed to construct the housing to maximize heat transfer, provide structural support and minimize weight. The housing 110, with the end bell 172, secure the bearings 173 for the rotor 170 providing structural support. Composite materials may be used in some embodiments for non-conducting elements of motor 142 (such as the rotor 170), motor driver 144 or other elements of the AEPS 100 to further minimize weight.

Full integration of the motor drive 144 with the electric motor 142 minimizes the overall size and weight. For example, in some embodiments, the power modules 240 of the motor drive 144 are affixed to the AEPS 100 housing beneath circumferentially grooved micro-channels 214 of the MMHS 200, thus minimizing thermal resistance. Gate driver circuitry, bus bars and capacitors are closely packaged to minimize volume.

EXAMPLE EMBODIMENTS

Example 1 includes an advanced electric propulsion system, the system comprising: a housing; an electric motor within the housing; a motor drive coupled to the electric motor; a thermal management system that comprises: a manifold-mini-channel heat sink (MMHS) integrated into the housing, wherein the manifold-mini-channel heat sink comprises: an inlet manifold having a plurality of air inlets formed in a front of the housing; a set of plurality of circumferentially grooved micro-channels formed in the housing and coupled to the air inlets and conductively thermally coupled to stator windings of the electric motor; an outlet manifold having a plurality of air outlets formed at a back of the housing and coupled to the set of plurality of circumferentially grooved micro-channels; wherein the electric motor comprises Pseudo-Edge Wound (PEW) stator windings configured to provide a low thermal resistance path from the stator of the electric motor to the housing; wherein the PEW stator windings comprise a high temperature tolerant thermally conductive electrical insulator.

Example 2 includes the propulsion system of Example 1, further comprising high thermal conductivity padding positioned between the PEW stator windings and the housing to establish a thermal conductive heat path from the PEW stator windings to the housing.

Example 3 includes the propulsion system of any of Examples 1-2, wherein the electric motor comprises an air-cooled permanent magnet (PM) motor coupled to the thermal management system for thermal cooling.

Example 4 includes the propulsion system of Example 3, wherein a rotor of the electric motor comprises multiple high mega-gauss oersteds (MGO) magnets contained within a composite sleeve.

Example 5 includes the propulsion system of any of Examples 1-4, wherein a rotor of the electric motor comprises a surface permanent magnet rotor with one of: a distributed winding, a concentrated winding, or a fractional slot winding.

Example 6 includes the propulsion system of any of Examples 1-5, wherein a rotor of the electric motor comprises an interior permanent magnet rotor with a concentrated winding.

Example 7 includes the propulsion system of any of Examples 1-6, wherein the electric motor comprises a multi pole/multi-slot Halbach array electric rotating machine.

Example 8 includes the propulsion system of any of Examples 1-7, wherein the motor drive comprises a three-phase multi-level inverter.

Example 9 includes the propulsion system of any of Examples 1-8, wherein the motor drive comprises: a plurality of power devices mounted to one or more stator winding stacks of the electric motor, wherein the one or more stator winding stacks provide a conductive heat path for heat dissipated by the plurality of power devices to be conducted to the MMHS integrated into the housing.

Example 10 includes the propulsion system of Example 9, wherein the plurality of power devices comprise one of: wide bandgap metal-oxide-semiconductor field-effect transistor (MOSFET) power devices; Silicon Carbide (SiC) MOSFET power devices; Gallium Nitride (GaN) power devices, or Insulated Gate Bipolar Transistor (IGBT) power devices.

Example 11 includes the propulsion system of any of Examples 9-10, the motor drive comprising: a digital signal processing (DSP) controller; and a gate driver coupled to the power devices; wherein the DSP controller executes control and protection algorithms that control firing of the power devices via the gate driver.

Example 12 includes a vehicle comprising: an electric propulsion system; and a battery; wherein the electric propulsion system comprises: a motor drive coupled to the battery; an electric motor coupled to the motor drive, wherein the motor drive and the electric motor are housed within a housing; a manifold-mini-channel heat sink (MMHS) integrated into the housing; the electric motor comprising Pseudo-Edge Wound (PEW) stator windings configured to provide a low thermal resistance path from a stator of the electric motor to the housing; a high temperature tolerant thermally conductive electrical insulator coating the PEW stator windings Example 13 includes the vehicle of Example 12, the manifold-mini-channel heat sink comprising: an inlet manifold having a plurality of air inlets formed in a front of the housing; a set of plurality of circumferentially grooved micro-channels formed in the housing and coupled to the air inlets and conductively thermally coupled to stator windings of the electric motor; an outlet manifold having a plurality of air outlets formed at a back of the housing and coupled to the set of plurality of circumferentially grooved micro-channels.

Example 14 includes the vehicle of Example 13, the electric propulsion system further comprising a fan impeller coupled to a shaft of the electric motor and configured to force an airflow through the plurality of circumferentially grooved micro-channels of the manifold-mini-channel heat sink.

Example 15 includes the vehicle of any of Examples 13-14, wherein the motor drive comprises: a plurality of power devices mounted to a surface of the motor drive adjacent to the set of the plurality of circumferentially grooved micro-channels.

Example 16 includes the vehicle of any of Examples 12-15, further comprising high thermal conductivity padding positioned between the PEW stator windings and the housing to establish a thermal conductive heat path from the PEW stator windings to the housing.

Example 17 includes the vehicle of any of Examples 12-16, wherein the motor drive comprises a three-phase multi-level inverter.

Example 18 includes the vehicle of Example 17, wherein the plurality of power devices comprise one of: wide bandgap metal-oxide-semiconductor field-effect transistor (MOSFET) power devices; Silicon Carbide (SiC) MOSFET power devices; Gallium Nitride (GaN) power devices, or Insulated Gate Bipolar Transistor (IGBT) power devices.

Example 19 includes the vehicle of any of Examples 17-18, the motor drive comprising: a digital signal processing (DSP) controller; and a gate driver coupled to the plurality of power devices; wherein the DSP controller executes sensor-less control and protection algorithms that control firing of the plurality of power devices via the gate driver.

Example 20 includes the vehicle of any of Examples 12-19, further comprising a propeller mounted to a shaft of a rotor of the electric motor at a front of the electric propulsion system.

In various alternative embodiments, system and/or device elements, method steps, or example implementations described throughout this disclosure (such the motor drive, DSP controller, gate drive, or any controllers, processors, circuits, or sub-parts thereof, for example) may be implemented at least in part using one or more computer systems, field programmable gate arrays (FPGAs), or similar devices comprising a processor coupled to a memory and executing code to realize those elements, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

As used herein, terms such as "power module", "inverter module", "sensor", "controller", "processor" refer to the names of elements that would be understood by those of skill in the art of avionics and transportation industries and are not used herein as nonce words or nonce terms for the purpose of invoking 35 USC 112(f).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. An advanced electric propulsion system, the system comprising:
   a housing;
   an electric motor within the housing;
   a motor drive coupled to the electric motor;
   a thermal management system that comprises:
      a manifold-mini-channel heat sink (MMHS) integrated into the housing, wherein the manifold-mini-channel heat sink comprises:
         an inlet manifold having a plurality of air inlets formed in a front of the housing, wherein an air inlet in the plurality of air inlets is respectively coupled to an inlet air passage in a plurality of inlet air passages;
         a set of plurality of circumferentially grooved micro-channels formed in the housing and coupled to the air inlets and conductively thermally coupled to stator windings of the electric motor; and
         an outlet manifold having a plurality of air outlets formed at a back of the housing and coupled to the set of plurality of circumferentially grooved micro-channels, wherein an air outlet in the plurality of air outlets is respectively coupled to an outlet air passage in a plurality of outlet air passages, wherein the set of the plurality of circumferentially grooved micro-channels connects each inlet air passage in the plurality of inlet air passages to an adjacent outlet air passage in the plurality of outlet air passages;
      wherein the electric motor comprises Pseudo-Edge Wound (PEW) stator windings configured to provide a low thermal resistance path from the stator of the electric motor to the housing;
   wherein the PEW stator windings comprise a high temperature tolerant thermally conductive electrical insulator.

2. The propulsion system of claim 1, further comprising high thermal conductivity padding positioned between the PEW stator windings and the housing to establish a thermal conductive heat path from the PEW stator windings to the housing.

3. The propulsion system of claim 1, wherein the electric motor comprises an air-cooled permanent magnet (PM) motor coupled to the thermal management system for thermal cooling.

4. The propulsion system of claim 3, wherein a rotor of the electric motor comprises multiple high mega-gauss oersteds (MGO) magnets contained within a composite sleeve.

5. The propulsion system of claim 1, wherein a rotor of the electric motor comprises a surface permanent magnet rotor with one of: a distributed winding, a concentrated winding, or a fractional slot winding.

6. The propulsion system of claim 1, wherein a rotor of the electric motor comprises an interior permanent magnet rotor with a concentrated winding.

7. The propulsion system of claim 1, wherein the electric motor comprises a multi pole/multi-slot Halbach array electric rotating machine.

8. The propulsion system of claim 1, wherein the motor drive comprises a three-phase multi-level inverter.

9. The propulsion system of claim 1, wherein the motor drive comprises:
   a plurality of power devices mounted to one or more stator winding stacks of the electric motor, wherein the one or more stator winding stacks provide a conductive heat path for heat dissipated by the plurality of power devices to be conducted to the MMHS integrated into the housing.

10. The propulsion system of claim 9, wherein the plurality of power devices comprise one of:

wide bandgap metal-oxide-semiconductor field-effect transistor (MOSFET) power devices;
Silicon Carbide (SiC) MOSFET power devices;
Gallium Nitride (GaN) power devices, or Insulated Gate Bipolar Transistor (IGBT) power devices.

11. The propulsion system of claim 9, the motor drive comprising:
a digital signal processing (DSP) controller; and
a gate driver coupled to the power devices;
wherein the DSP controller executes control and protection algorithms that control firing of the power devices via the gate driver.

12. A vehicle comprising:
an electric propulsion system; and
a battery;
wherein the electric propulsion system comprises:
a motor drive coupled to the battery;
an electric motor coupled to the motor drive, wherein the motor drive and the electric motor are housed within a housing;
a manifold-mini-channel heat sink (MMHS) integrated into the housing, wherein the MMHS comprises:
an inlet manifold having a plurality of air inlets formed in a front of the housing, wherein an air inlet in the plurality of air inlets is respectively coupled to an inlet air passage in a plurality of inlet air passages;
a set of plurality of circumferentially grooved micro-channels formed in the housing and coupled to the air inlets and conductively thermally coupled to stator windings of the electric motor; and
an outlet manifold having a plurality of air outlets formed at a back of the housing and coupled to the set of plurality of circumferentially grooved micro-channels, wherein an air outlet in the plurality of air outlets is respectively coupled to an outlet air passage in a plurality of outlet air passages, wherein the set of the plurality of circumferentially grooved micro-channels connects each inlet air passage in the plurality of inlet air passages to an adjacent outlet air passage in the plurality of outlet air passages;
the electric motor comprising Pseudo-Edge Wound (PEW) stator windings configured to provide a low thermal resistance path from a stator of the electric motor to the housing;
a high temperature tolerant thermally conductive electrical insulator coating the PEW stator windings.

13. The vehicle of claim 12, the electric propulsion system further comprising a fan impeller coupled to a shaft of the electric motor and configured to force an airflow through the plurality of circumferentially grooved micro-channels of the manifold-mini-channel heat sink.

14. The vehicle of claim 12, wherein the motor drive comprises:
a plurality of power devices mounted to a surface of the motor drive adjacent to the set of the plurality of circumferentially grooved micro-channels.

15. The vehicle of claim 12, further comprising high thermal conductivity padding positioned between the PEW stator windings and the housing to establish a thermal conductive heat path from the PEW stator windings to the housing.

16. The vehicle of claim 12, wherein the motor drive comprises a three-phase multi-level inverter.

17. The vehicle of claim 16, wherein the plurality of power devices comprise one of:
wide bandgap metal-oxide-semiconductor field-effect transistor (MOSFET) power devices;
Silicon Carbide (SiC) MOSFET power devices;
Gallium Nitride (GaN) power devices, or Insulated Gate Bipolar Transistor (IGBT) power devices.

18. The vehicle of claim 16, the motor drive comprising:
a digital signal processing (DSP) controller; and
a gate driver coupled to the plurality of power devices;
wherein the DSP controller executes sensor-less control and protection algorithms that control firing of the plurality of power devices via the gate driver.

19. The vehicle of claim 12, further comprising a propeller mounted to a shaft of a rotor of the electric motor at a front of the electric propulsion system.

* * * * *